United States Patent
Va et al.

(10) Patent No.: US 11,402,464 B2
(45) Date of Patent: Aug. 2, 2022

(54) RADAR LEAKAGE MEASUREMENT UPDATE

(71) Applicant: Samsung Electronics Co., Ltd., Suwon-si (KR)

(72) Inventors: Vutha Va, Plano, TX (US); Wenxun Qiu, Allen, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 323 days.

(21) Appl. No.: 16/666,107

(22) Filed: Oct. 28, 2019

(65) Prior Publication Data

US 2020/0271753 A1 Aug. 27, 2020

Related U.S. Application Data

(60) Provisional application No. 62/810,301, filed on Feb. 25, 2019.

(51) Int. Cl.
*G01S 7/03* (2006.01)
*G01S 7/40* (2006.01)

(52) U.S. Cl.
CPC ........... *G01S 7/038* (2013.01); *G01S 7/40* (2013.01)

(58) Field of Classification Search
None
See application file for complete search history.

(56) References Cited

U.S. PATENT DOCUMENTS

| | | |
|---|---|---|
| 2008/0294019 A1 | 11/2008 | Tran |
| 2010/0109938 A1 | 5/2010 | Oswald et al. |
| 2017/0168140 A1 | 6/2017 | Hosokawa et al. |
| 2018/0031695 A1 | 2/2018 | Carswell et al. |
| 2018/0293886 A1 | 10/2018 | Frederick et al. |

FOREIGN PATENT DOCUMENTS

| | | |
|---|---|---|
| JP | 3401618 B2 | 4/2003 |
| JP | 2010-032307 A | 2/2010 |
| KR | 10-2018-0110269 A | 10/2018 |
| WO | 9919744 A1 | 4/1999 |

OTHER PUBLICATIONS

Sittakul et al., "Leakage error measurement of vector network analyser in National Institute of Metrology (Thailand)", IET Science, Measurement & Technology, Feb. 5, 2018, 5 pages.

International Search Report dated Jun. 5, 2020 in connection with International Patent Application No. PCT/KR2020/002653, 3 pages.

Shrader et al., "Chapter 15: MTI Radar", In: Skolnik (Ed.), Radar Handbook, Second Edition, 1990, McGraw-Hill, Inc., pp. 15.1-15.34.

Supplementary European Search Report dated Dec. 20, 2021, in connection with European Application No. 20762638.3, 10 pages.

*Primary Examiner* — Whitney Moore

(57) ABSTRACT

A method and electronic device for updating a leakage response for leakage cancelation. The electronic device includes a radar transceiver, a memory, and a processor. The processor is configured to determine whether an object is within proximity of and within a field of view of the radar transceiver, obtain a leakage measurement for the radar transceiver in response to determining that no object is proximate to and within the field of view of the radar transceiver, and update the leakage response for leakage cancelation based on the leakage measurement.

20 Claims, 14 Drawing Sheets

RADAR LEAKAGE MEASUREMENT UPDATE

CROSS-REFERENCE TO RELATED APPLICATION AND CLAIM OF PRIORITY

This application claims priority under 35 U.S.C. § 119(e) to U.S. Provisional Patent Application No. 62/810,301 filed Feb. 25, 2019, the contents of which is incorporated herein by reference in its entirety.

TECHNICAL FIELD

The present disclosure relates generally to addressing signal leakage in radar applications. More specifically, the present disclosure relates to opportunistic updating of radar leakage measurements for radar transceivers.

BACKGROUND

Radar can operate at various frequency bands including, but not limited to, 6-8 GHz, 28 GHz, 39 GHz, 60 GHz, and 77 GHz. Radar operates to localize targets in the radar field of view in terms of azimuth (range) and/or elevation (angle) and/or velocity. For mono-static radar, the transmitter and the receiver are installed closely together, which results in the transmission of a leakage signal directly from the transmitter to the receiver. The leakage signal interferes with radar detection and ranging. Strong leakage signals can interfere with the signals returning from a target, which can mask the target to prevent detection and/or render range estimation inaccurate. Accordingly, leakage signals can be canceled by various conventional methods to increase the reliability of target detection and ranging.

SUMMARY

Embodiments of the present disclosure include a method, an electronic device, and a non-transitory computer readable medium for leakage cancelation. In one embodiment, the electronic device includes a radar transceiver, a memory, and a processor. The processor is configured to determine whether an object is within proximity of and within a field of view of the radar transceiver, obtain a leakage measurement for the radar transceiver in response to determining that no object is proximate to and within the field of view of the radar transceiver, and update the leakage response for leakage cancelation based on the leakage measurement.

In another embodiment, a method of canceling leakage includes determining, by an electronic device having a radar transceiver, whether an object is within proximity of and within a field of view of the radar transceiver; obtaining a leakage measurement for the radar transceiver in response to determining that no object is proximate to and within the field of view of the radar transceiver; and updating a leakage response for leakage cancelation based on the leakage measurement.

In another embodiment, an electronic device includes a non-transitory computer readable medium. The non-transitory computer readable medium stores instructions that, when executed by the processor, cause the processor to determine, by an electronic device having a radar transceiver, whether an object is within proximity of and within a field of view of the radar transceiver; obtain a leakage measurement for the radar transceiver in response to determining that no object is proximate to and within the field of view of the radar transceiver; and update a leakage response for leakage cancelation based on the leakage measurement.

Other technical features may be readily apparent to one skilled in the art from the following figures, descriptions, and claims.

Before undertaking the DETAILED DESCRIPTION below, it may be advantageous to set forth definitions of certain words and phrases used throughout the present disclosure. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning "and/or". The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. Likewise, the term "set" means one or more. Accordingly, a set of items can be a single item or a collection of two or more items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout the present disclosure. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which like reference numerals represent like parts.

DETAILED DESCRIPTION

The figures included herein, and the various embodiments used to describe the principles of the present disclosure are by way of illustration only and should not be construed in any way to limit the scope of the disclosure. Those skilled in the art will understand that the principles of the present disclosure may be implemented in any suitably arranged in a wired or wireless communication system.

Figure 1:
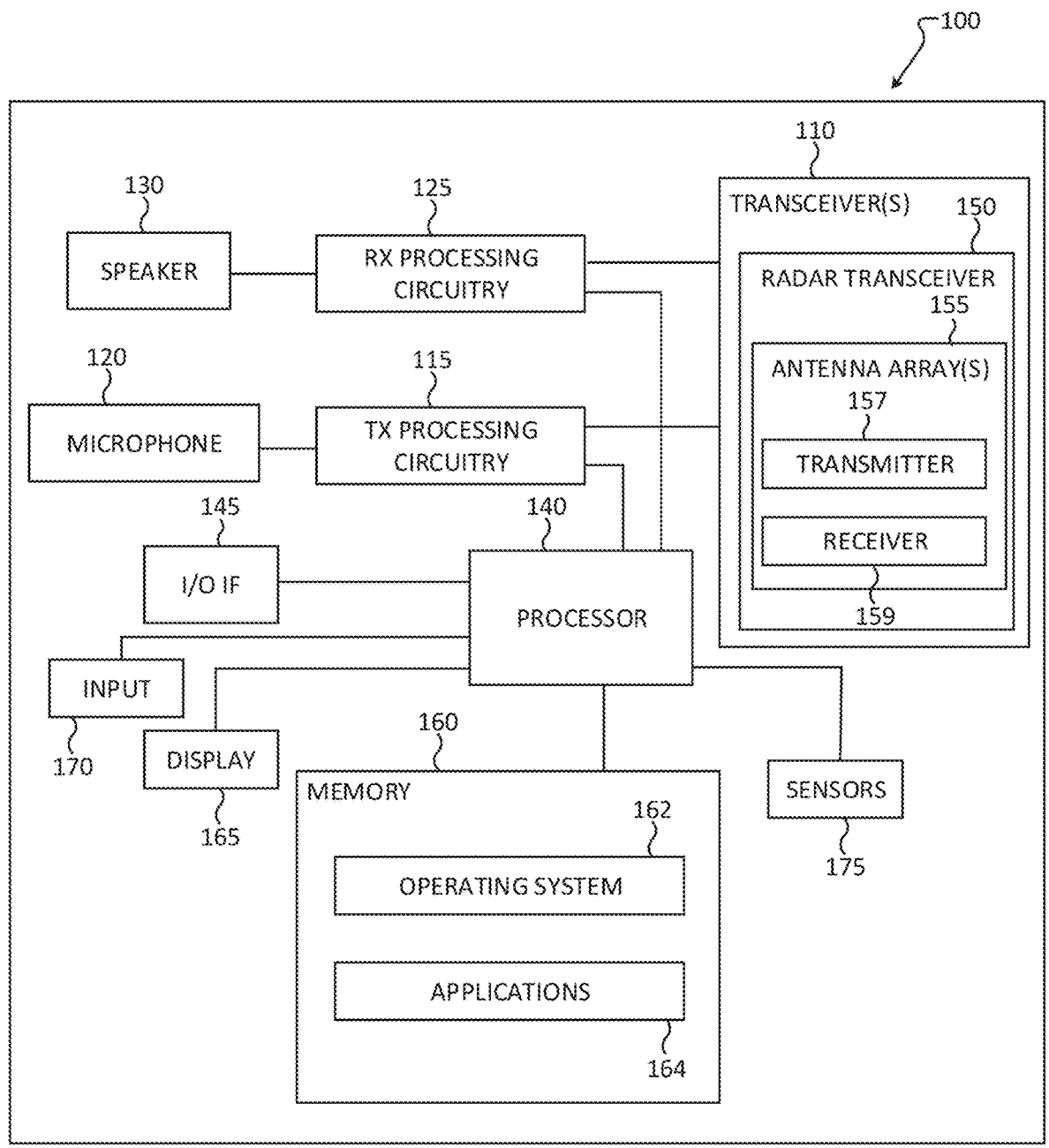
FIG. 1 illustrates an electronic device according to various embodiments of the present disclosure.

FIG. 1 illustrates an electronic device according to various embodiments of the present disclosure. The embodiment of the electronic device 100 shown in FIG. 1 is for illustration only. Other embodiments can be used without departing from the scope of the present disclosure.

As shown in FIG. 1, the electronic device 100 includes a radio frequency (RF) transceiver 110, transmit (TX) processing circuitry 115, a microphone 120, receive (RX) processing circuitry 125, a speaker 130, a processor 140, an input/output (I/O) interface (IF) 145, a memory 160, a display 165, an input 170, and sensors 175. Non-limiting examples of sensors 175 include inertial sensors, proximity sensors, infrared sensors, ultrasonic sensors, laser sensors, and capacitive sensors that can provide contextual operational data usable for opportunistically updating a leakage response. The memory 160 includes an operating system (OS) 162 and one or more applications 164. The one or more applications 164 can be Type 1 applications or Type 2 applications that can be used to provide additional contextual operational data also usable for opportunistically updating a leakage response.

The transceiver 110 transmits signals to other components in a system and receives incoming signals transmitted by other components in the system. For example, the transceiver 110 transmits and receives RF signals, such as BLUETOOTH or WI-FI signals, to and from an access point (such as a base station, WI-FI router, BLUETOOTH device) of a network (such as a WI-FI, BLUETOOTH, cellular, 5G, LTE, LTE-A, WiMAX, or any other type of wireless network). The received signal is processed by the RX processing circuitry 125. The RX processing circuitry 125 may transmit the processed signal to the speaker 130 (such as for voice data) or to the processor 140 for further processing (such as for web browsing data). The TX processing circuitry 115 receives voice data from the microphone 120 or other outgoing data from the processor 140. The outgoing data can include web data, e-mail, or interactive video game data. The TX processing circuitry 115 processes the outgoing data to generate a processed signal. The transceiver 110 receives the outgoing processed signal from the TX processing circuitry 115 and converts the received signal to an RF signal that is transmitted via an antenna. In other embodiments, the transceiver 110 can transmit and receive radar signals to detect the potential presence of an object in the surrounding environment of the electronic device 100.

In this embodiment, one of the one or more transceivers in the transceiver 110 includes is a radar transceiver 150 configured to transmit and receive signals for detection and ranging purposes. For example, the radar transceiver 150 may be any type of transceiver including, but not limited to a WiFi transceiver, for example, an 802.11ay transceiver. The radar transceiver 150 includes antenna array(s) 155 that includes transmitter 157 and receiver 159 antenna arrays. In some embodiments, the signals transmitted by the radar transceiver 150 can include, but are not limited to, millimeter wave (mmWave) signals. The radar transceiver 150 can receive the signals, which were originally transmitted from the radar transceiver 150, after the signals have bounced or reflected off of target objects in the surrounding environment of the electronic device 100. The processor 140 can analyze the time difference between when the signals are transmitted by the radar transceiver 150 and received by the radar transceiver 150 to measure the distance of the target objects from the electronic device 100.

The transmitter 157 and the receiver 159 can be fixed in close proximity to each other such that the distance of separation between them is small. For example, the transmitter 157 and the receiver 159 can be located within a few centimeters of each other. In some embodiments, the transmitter 157 and the receiver 159 can be co-located in a manner that the distance of separation is indistinguishable. Based on context information available from other applications executing on the electronic device 100, the processor 140 execute instructions to cause the electronic device to opportunistically update leakage measurements for the transmitter 157 and the receiver 159 usable to cancel a leakage signal that is transmitted from the transmitter 157 to the receiver 159. The leakage measurements can be represented by a CIR as described in more detail in FIG. 3.

The TX processing circuitry 115 receives analog or digital voice data from the microphone 120 or other outgoing baseband data (such as web data, e-mail, or interactive video game data) from the processor 140. The TX processing circuitry 115 encodes, multiplexes, and/or digitizes the outgoing baseband data to generate a processed baseband or IF signal. The transceiver 110 receives the outgoing processed baseband or IF signal from the TX processing circuitry 115 and up-converts the baseband or IF signal to an RF signal that is transmitted via the antenna 105.

The processor 140 is also capable of executing the operating system 162 in the memory 160 in order to control the overall operation of the electronic device 100. For example, the processor 140 can move data into or out of the memory 160 as required by an executing process. In some embodiments, the processor 140 is configured to execute the applications 164 based on the OS program 162 or in response to signals received from external devices or an operator. In some embodiments, the memory 160 is further configured to store data, such as a leakage response for leakage cancelation, which the processor 140 can utilize to cause various components of the electronic device to perform leakage cancelation individually or cooperatively. In some embodiments, the processor 140 can control the reception of forward channel signals and the transmission of reverse channel signals by the transceiver 110, the RX processing circuitry 125, and the TX processing circuitry 115 in accordance with well-known principles. In some embodiments, the processor 140 includes at least one microprocessor or microcontroller.

The processor 140 is also coupled to the I/O interface 145, the display 165, the input 170, and the sensor 175. The I/O interface 145 provides the electronic device 100 with the ability to connect to other devices such as laptop computers and handheld computers. The I/O interface 145 is the communication path between these accessories and the processor 140. The display 165 can be a liquid crystal display (LCD), light-emitting diode (LED) display, organic LED (OLED), active matrix OLED (AMOLED), or other display capable of rendering text and/or graphics, such as from websites, videos, games, images, and the like.

The processor 140 can be coupled to the input 170. An operator of the electronic device 100 can use the input 150 to enter data or inputs into the electronic device 100. Input 150 can be a keyboard, touch screen, mouse, track-ball, voice input, or any other device capable of acting as a user interface to allow a user to interact with electronic device 100. For example, the input 150 can include voice recognition processing thereby allowing a user to input a voice command via microphone 120. For another example, the input 150 can include a touch panel, a (digital) pen sensor, a key, or an ultrasonic input device. The touch panel can recognize, for example, a touch input in at least one scheme among a capacitive scheme, a pressure sensitive scheme, an infrared scheme, or an ultrasonic scheme.

The electronic device 100 can further include one or more sensors 175 that meter a physical quantity or detect an activation state of the electronic device 100 and convert metered or detected information into an electrical signal. For example, sensor(s) 175 may include one or more buttons for touch input, one or more cameras, a gesture sensor, an eye tracking sensor, a gyroscope or gyro sensor, an air pressure sensor, a magnetic sensor or magnetometer, an acceleration sensor or accelerometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an infrared (IR) sensor, an ultrasound sensor, a fingerprint sensor, and the like. The sensor(s) 175 can further include a control circuit for controlling at least one of the sensors included therein.

In various embodiments, the electronic device 100 may be a phone or tablet. In other embodiments, the electronic device 100 may be a robot or any other electronic device using a radar transceiver. FIG. 1. does not limit the present disclosure to any particular type of electronic device.

Figure 2:
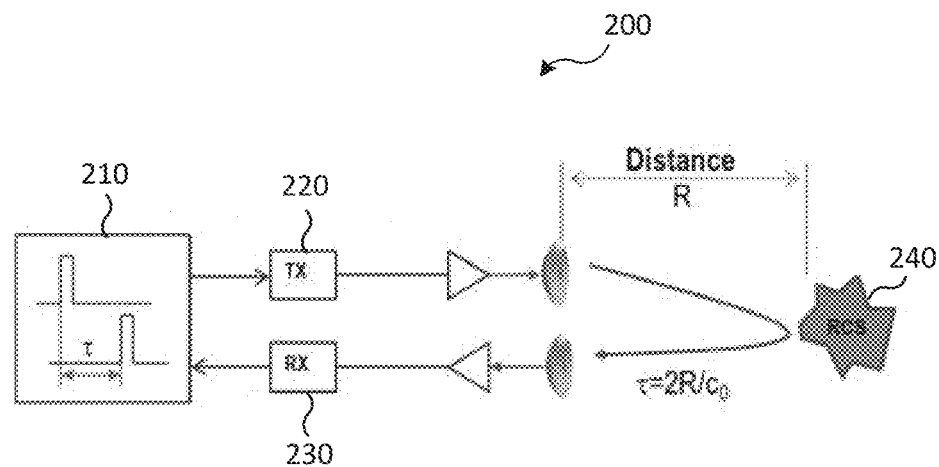
FIG. 2 illustrates a monostatic radar according to various embodiments of the present disclosure.

FIG. 2 illustrates a monostatic radar according to various embodiments of the present disclosure. The embodiment of the monostatic radar 200 shown in FIG. 2 is for illustration only and other embodiments can be used without departing from the scope of the present disclosure. The monostatic radar 200 illustrated in FIG. 2 includes a processor 210, a transmitter 220, and a receiver 230. In some embodiments, the processor 210 can be the processor 140.

In some embodiments, the transmitter 220 and the receiver 230 can be the radar transceiver 150 and connected to the transmitter 157 and receiver 159 antenna arrays, respectively, included in the antenna array(s) 155. In various embodiments, the transmitter 220 and the receiver 230 are co-located using a common antenna or nearly co-located while separate but adjacent antennas. The monostatic radar 200 is assumed to be coherent such that the transmitter 220 and the receiver 230 are synchronized via a common time reference.

The processor 210 controls the transmitter 220 to transmit a radar signal or radar pulse. The radar pulse is generated as a realization of a desired "radar waveform" modulated onto a radio carrier frequency and transmitted through a power amplifier and antenna (shown as a parabolic antenna), such as the transmitter 220, either omni-directionally or focused into a particular direction. After the radar pulse has been transmitted, a target 240 at a distance R from the radar 200 and within a field-of-view of the transmitted pulse will be illuminated by RF power density $P_t$ (in units of $W/m^2$) for the duration of the transmission. To the first order, $P_t$ is described by Equation 1:

$$p_t = \frac{P_T}{4\pi R^2} G_T = \frac{P_T}{4\pi R^2} \frac{A_T}{(\lambda^2/4\pi)} = P_T \frac{A_T}{\lambda^2 R^2},$$

where $P_T$ is a transmit power [W], $G_T$, is a transmit antenna gain [dBi], $A_T$ is an effective aperture area [$m^2$], $\lambda$ is a wavelength of the radar signal RF carrier signal [m], and R is the target distance [m].

The transmit power density impinging onto the target surface leads to reflections depending on the material composition, surface shape, and dielectric behavior at the frequency of the radar signal. Off-direction scattered signals are generally not strong enough to be received back at the receiver 230, so only direct reflections contribute to a detectable, received signal. Accordingly, the illuminated area or areas of the target with normal vectors directing back to the receiver 230 act as transmit antenna apertures with directivities, or gains, in accordance with their effective aperture area or areas. The reflected-back power $P_{refl}$ is described by Equation 2:

$$P_{refl} = p_t A_t G_t \sim p_t A_t r_t \frac{A_t}{(\lambda^2/4\pi)} = p_t RCS,$$

where $P_{refl}$ is an effective (isotropic) target-reflected power [W], $A_t$ is an effective target area normal to the radar direction [$m^2$], $r_t$ is a reflectivity of the material and shape [0, . . . , 1], $G_t$ is a corresponding aperture gain [dBi], and RCS is a radar cross section [$m^2$].

As depicted in Equation 2, the radar cross section (RCS) is an equivalent area that scales proportionally to the square of the actual reflecting area, is inversely proportional to the square of the wavelength, and is reduced by various shape factors and the reflectivity of the material itself. For example, for a flat, fully reflecting mirror of an area $A_t$, large compared with $\lambda^2$, RCS=$4\pi A_t^2/\lambda^2$. Due to the material and shape dependency, it is difficult to deduce the actual physical area of the target 240 based on the reflected power even if the distance R from the target to the radar 200 is known.

The target-reflected power at the location of the receiver 230 is based on the reflected-power density at the reverse distance R, collected over the receiver antenna aperture area. The received, target-reflected power $P_R$ is described by Equation 3:

$$P_R = \frac{P_{refl}}{4\pi R^2} A_R = P_T \cdot RCS \frac{A_T A_R}{4\pi \lambda^2 R^4},$$

where $P_R$ is the received, target-reflected power [W] and $A_R$ is the receiver antenna effective aperture area [$m^2$]. In some embodiments, $A_R$ can be the same as $A_T$.

Such a radar system is usable as long as the receiver signal exhibits a sufficient signal-to-noise ratio (SNR). The particular value of the SNR depends on the waveform and detection method used. The SNR is described by Equation 4:

$$SNR = \frac{P_R}{kT \cdot B \cdot F},$$

where kT is Boltzmann's constant x temperature [W/Hz], B is the radar signal bandwidth [Hz], and F is the receiver noise factor, referring to the degradation of receive signal SNR due to noise contributions to the receiver circuit itself.

In some embodiments, the radar signal can be a short pulse with a duration, or width, denoted by $T_P$. In these embodiments, the delay $\tau$ between the transmission and reception of the corresponding echo will be equal to $\tau$=2R/c, where c is the speed of light propagation in the medium, such as air. In some embodiments, there can be several targets 240 at slightly different distances R. In these embodiments, the individual echoes of each separate target 240 is distinguished as such only if the delays differ by at least one pulse width, and the range resolution of the radar is described as $\Delta R=c\Delta\tau/2=cT_P/2$. A rectangular pulse of duration $T_P$ exhibits a power spectral density $P(f)\sim(sin(\pi f T_P)/(\pi f T_P))^2$ with the first null at its bandwidth $B=1/T_P$. Therefore, the connection of the range resolution of a radar with the bandwidth of the radar waveform is described by Equation 5:

$$\Delta R=c/2B$$

Based on the reflected signals received by the receiver 230, the processor 210 generates a metric that measures the response of the reflected signal as a function of the distance of the target 240 from the radar. In some embodiments, the metric can be a CIR.

Figure 3:
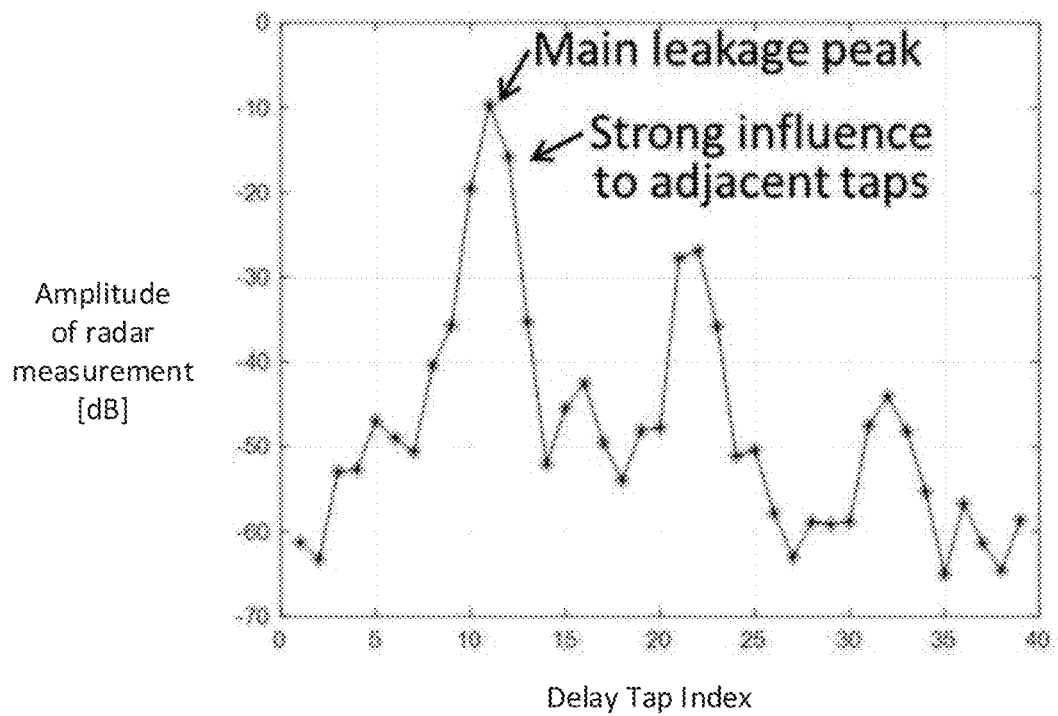
FIG. 3 illustrates an example of a channel impulse response (CIR) according to various embodiments of the present disclosure.

FIG. 3 illustrates an example of a CIR depicting a measured leakage response according to various embodiments of the present disclosure. The CIR is a response metric based on the signals received by the receiver 230. For example, the CIR is a measure of amplitude and/or phase of a reflected signal as a function of distance. As shown in FIG. 3, the CIR is depicted with the delay tap index denoted on the x-axis, measuring the distance, and the amplitude of radar measurement [dB] denoted on the y-axis. In a monostatic radar, for example the radar 200, that has separate transmitting and receiving antenna modules, a strong signal can radiate directly from the transmitter 220 to the receiver 230 causing a strong response at the delay corresponding to the separation between the transmitter 220 and receiver 230. The strong signal radiating from the transmitter 220 to the receiver 230 is referred to as a leakage signal. Even if the direct leakage signal from the transmitter 220 can be assumed to correspond to a single delay, the effect of the direct leakage signal can still impact multiple delay taps adjacent to the direct leakage signal.

In the measured leakage response illustrated in FIG. 3, the main leakage peak is denoted at tap 11. In addition, taps 10 and 12 also have strong responses, noted by the responses being greater than 20 dB above the noise floor. Because of the additional responses such as shown at taps 10 and 12, it is difficult to reliably detect and estimate the target range within those first few taps from the leakage taps.

Figure 4:
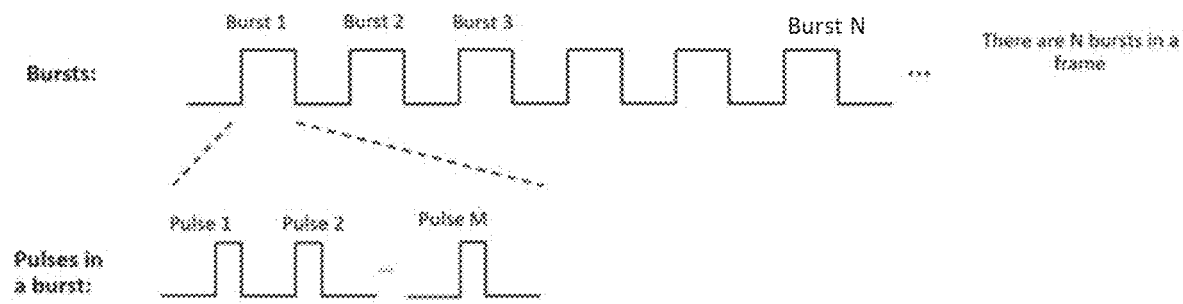
FIG. 4 illustrates a timing diagram for radar transmission according to various embodiments of the present disclosure.

FIG. 4 illustrates a timing diagram for radar transmission according to various embodiments of the present disclosure. In particular, FIG. 4 illustrates a frame structure that divides time into frames that each comprises multiple bursts. Each burst includes a plurality of pulses. The timing diagram illustrated in FIG. 4 assumes an underlying pulse compression radar system.

As illustrated in FIG. 4, each frame includes a number of bursts N, illustrated as Burst 1, Burst 2, Burst 3, up to Burst N. Each burst is formed from a plurality of pulses. For example, FIG. 4 illustrates that Burst 1 comprises a plurality of pulses referenced as Pulse 1, Pulse 2, etc. through Pulse M.

For example, in Burst 1 a radar transceiver, such as the transmitter 157, can transmit Pulse 1, Pulse 2, and Pulse M. In Burst 2, the transmitter 157 can transmit similar pulses Pulse 1, Pulse 2, and Pulse M. Each different pulse (Pulse 1, Pulse 2, and Pulse M) and burst (Burst 1, Burst 2, Burst 3, etc.) can utilize a different transmission/reception antenna configuration, that is the active set of antenna elements and corresponding analog/digital beamforming weights, to identify the specific pulses and bursts. For example, each pulse or burst can utilize a different active set of antenna elements and corresponding analog/digital beamforming weights to identify specific pulses and bursts.

Following each frame, a processor, such as the processor 140, connected to the transmitter 157 obtains radar measurements at the end of each frame. For example, the radar measurements can be depicted as a three-dimensional complex CIR matrix. The first dimension may correspond to the burst index, the second dimension may correspond to the pulse index, and the third dimension may correspond to the delay tap index. The delay tap index can be translated to the measurement of range or time of flight of the received signal.

The leakage signal from the radar transmitter to the radar receiver can hinder target detection and range estimation abilities of radar, particularly for objects within a proximity of and within a field of view of the radar transceiver. In some exemplary embodiments, objects are within the proximity of and within the field of view of the radar transceiver when the object is less than about 20 cm from the radar transceiver. In a more particular embodiment, the objects are within the proximity of and within the field of view of the radar transceiver when the object is less than about 10 cm from the radar transceiver.

Cancelation of the leakage signal can overcome this issue. Pre-measured leakage signals stored on an electronic device, such as in memory 160 of electronic device 100, can be used to cancel the leakage signal from radar measurements. This approach is feasible because the leakage signal is propagated through a rigidly defined path determined by the device hardware, which can be assumed to be constant for a relatively long duration under similar environmental conditions. Occasional update of the stored leakage measurement can ensure the accuracy of radar-based sensing. So that resources are not continually being used to update a leakage measurement when inconvenient or unnecessary, novel aspects of the various embodiments disclosed herein are directed to opportunistically updating a stored leakage measurement when necessary and/or when possible. For example, a stored leakage measurement that was recently obtained may not need to be updated and therefore can be deemed valid. If a stored leakage measurement is no longer valid, then the stored leakage measurement can be updated only when possible. For example, update of a stored leakage measurement is not possible if an object is within a proximity to and within a field of view of the radar transceiver.

Various embodiments of the present disclosure are directed to the use of context information from various applications executing on the electronic device to determine whether a stored leakage measurement is still valid, and if not, when update of the stored leakage measurement is possible. Regardless of whether the executing applications directly utilize radar measurements, successful operation of these applications is generally contingent upon the lack of objects within a proximity to and within a field of view of the radar transceiver. An exemplary application that will be explained in more detail in the figures that follow involves radar-based face authentication. In this case, for successful operation, there must be no obstacle between the radar antenna modules and the user's face, which are typically separated by a distance between 20 to 50 cm. Up-to-date leakage measurements can be extracted from the radar measurements that have yielded a desirable result (e.g., a successful authentication). The extracted leakage measurement can be used to update a leakage response of a radar transceiver in an electronic device by canceling out the leakage signal of the radar measurement. The updated leakage response can then be used for a reliable detection and accurate ranging of targets, particularly within the proximity of and within a field of view of the radar transceiver.

Figure 5:
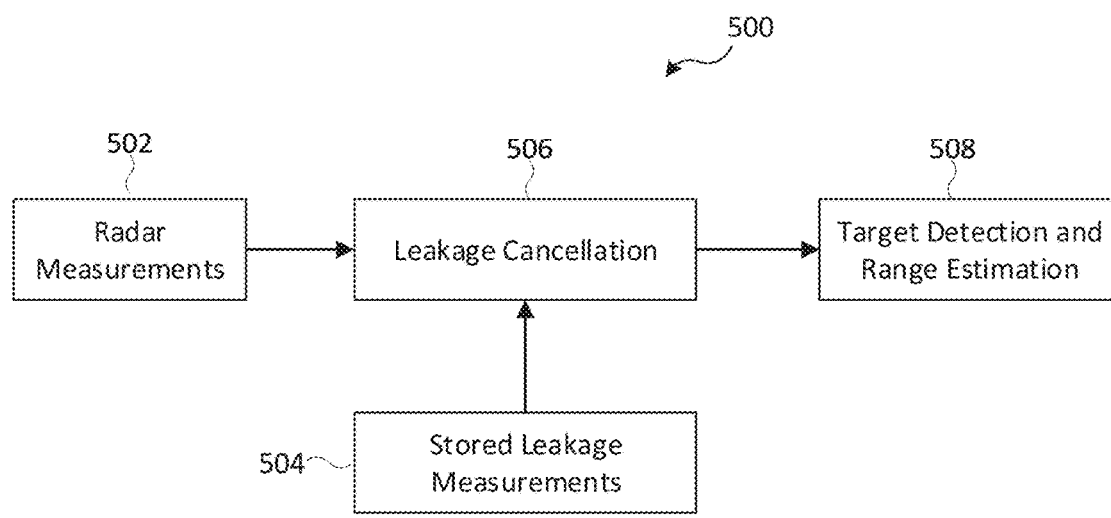
FIG. 5 illustrates a flowchart for leakage cancelation according to various embodiments of the present disclosure.

FIG. 5 illustrates a flowchart of general operations for leakage cancelation according to various embodiments of the present disclosure. A processor can execute instructions to cause an electronic device, such as processor 140 of electronic device 100 in FIG. 1, to undergo the operations described in flowchart 500 for canceling the effect of the leakage signal that is transmitted directly from a transmitter to a receiver. For example, radar measurements taken in operation 502 include a leakage signal that can be canceled in operation 506 by stored leakage measurements obtained from operation 504. A stored leakage measurement is data describing signal strength of a set of leakage signals relative to a delay tap index which can be attributed to the leakage signal transmitted directly from the transmitter to the receiver of a radar transceiver. The stored leakage measurement can be represented in a CIR as shown in FIG. 3. Target detection and range estimation can be achieved in operation 508 using the radar measurements after the leakage cancellation.

The stored leakage measurements of FIG. 5 can be associated with one or more state variables, such as a timestamp, temperature, or humidity describing conditions when the stored leakage measurement was obtained. Each of the state variables can be further divided into one or more categories or ranges. For example, the stored leakage measurements could be stored for each temperature category (such as high, medium, low, or the temperature could be divided into multiple bins of size N degrees each). Then, a leakage measurement update could be done for each temperature category separately. Also, when the stored measurement is used to remove the leakage for the radar detection and estimation, the temperature when the radar measurement was done can be used to select the appropriate stored leakage measurement to be used for the leakage removal. Other types of information could also be used in a similar manner. For example, the humidity is another factor that could affect the behavior of the circuitry of the device and thus can also impact the leakage behavior, and it could be used as a part of the operating environment description.

Figure 6:
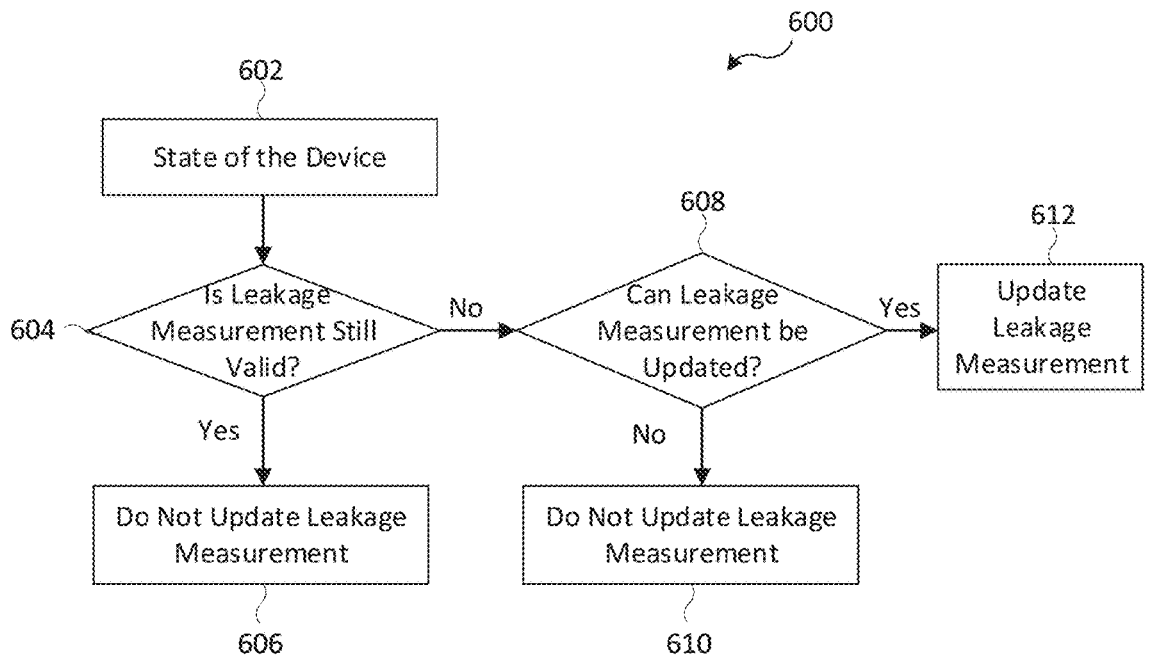
FIG. 6 illustrates a flowchart of steps for opportunistically updating a leakage measurement according to various embodiments of the present disclosure.

FIG. 6 illustrates a flowchart of operations for opportunistically updating a leakage measurement according to a non-limiting embodiment of the present disclosure. A processor can execute instructions to cause an electronic device, such as processor 140 of electronic device 100 in FIG. 1, to undergo the operations described in flowchart 600 to determine validity of a stored leakage measurement and to update the stored leakage signal if necessary and if possible.

A state of the electronic device is identified in operation 602. The state of the device is based on one or more state variables, examples of which can include time, temperature, and humidity. Based on the state of the device, the validity of a stored leakage measurement can be determined in operation 604. The flowcharts depicted in FIGS. 7-9 and the related embodiments illustrate some non-limiting examples for determining the validity of stored leakage measurements based on state variables.

If the stored leakage measurement is still valid, then the stored leakage measurement is not updated in operation 606. Otherwise, if the stored leakage measurement is no longer valid, as determined in operation 604, then a determination as to whether the stored leakage measurement can be updated is made in operation 608. Flowchart 600 proceeds to operation 610 if the stored leakage measurement cannot be updated, or to operation 612 if the stored leakage measurement can be updated.

There are different approaches for updating stored leakage measurements in operation 612. For example, a simple approach is to replace the stored leakage measurement with a newly obtained leakage measurement. Another approach involves averaging, either a simple average of all past valid leakage measurements or a weighted average. In one embodiment, the weighted average can include all historical leakage measurements and in another embodiment, the weighted average spans only a certain window of time to include only a subset of historical leakage measurements. Yet another weighted average approach could use the timestamp of the leakage measurements to determine the age of the measurements and perform averaging weighted by the freshness of the measurements (e.g., giving more weight to more recent leakage measurements). Note that if the leakage measurements are stored for different types of categories of the operating environment of the radar (e.g., defined by state variables such as temperature and/or humidity), the averaging methods described so far could be used on the measurements belonging to each operating environment category separately.

Figure 7:
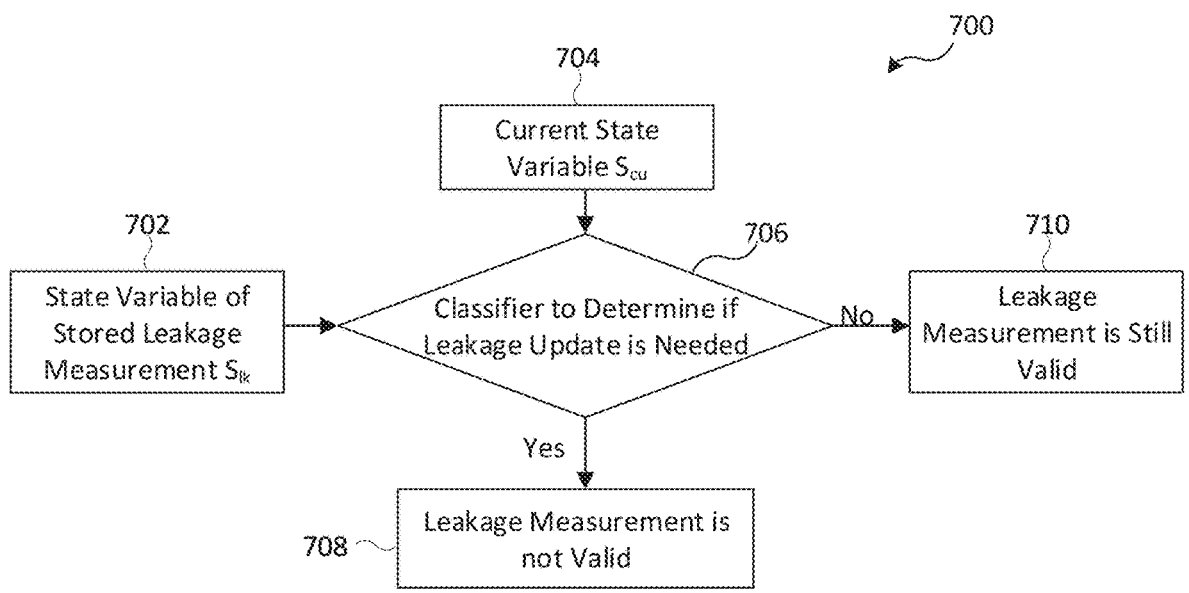
FIG. 7 illustrates a flowchart of steps for determining validity of leakage measurements according to various embodiments of the present disclosure.

FIG. 7 illustrates a flowchart of steps for determining validity of stored leakage measurements according to various embodiments of the present disclosure. A classifier can determine if a leakage update is needed (i.e., make the validity determination) in operation 706 based on a stored state variable ($S_{lk}$) of a stored leakage measurement from operation 702 and a current state variable ($S_{cu}$) of the electronic device from operation 704. The stored state variable can be maintained in memory 160 and compared with the corresponding state variable determined by one or more sensors 175 and/or applications 164. Based on the results of the determination made in operation 706, flowchart 700 proceeds to operation 708 if the stored leakage measurement is not valid, or to operation 710 if the stored leakage measurement is still valid.

Figure 8:
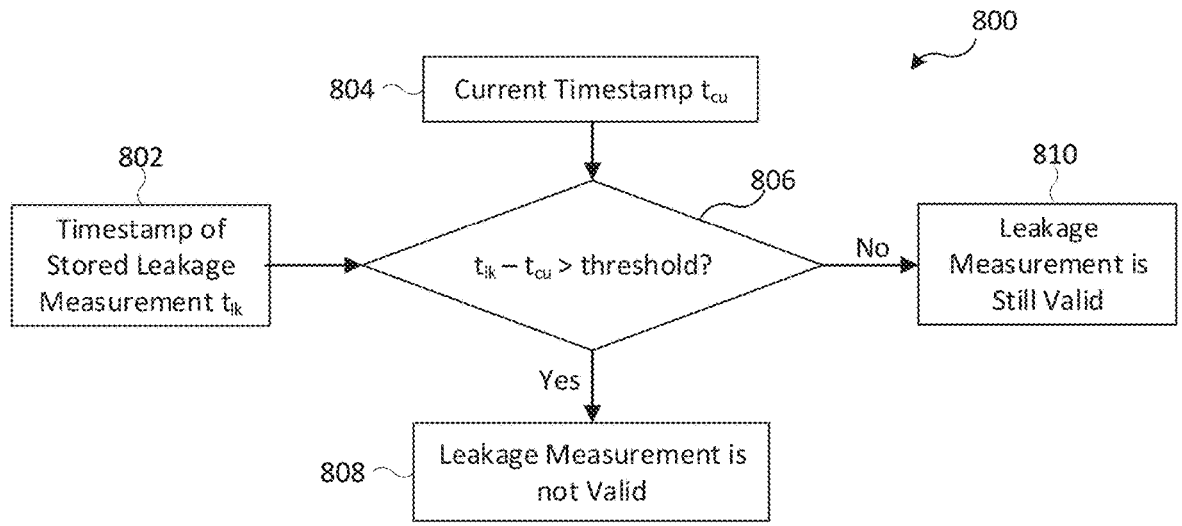
FIG. 8 illustrates a flowchart for determining validity of leakage measurements with reference to time as a state variable according to various embodiments of the present disclosure.

FIG. 8 illustrates a flowchart for determining validity of leakage measurements with reference to time as a state variable according to various embodiments of the present disclosure. A processor can make the validity determination in operation 806 using the stored timestamp ($t_{lk}$) of a stored leakage measurement from operation 802 and a current timestamp ($t_{cu}$) from operation 804. The stored state variable can be maintained in memory 160 and compared with the corresponding state variable determined by one or more applications 164 capable of providing a current timestamp. For example, in operation 806 a processor can make a determination if the difference between the stored timestamp and the current timestamp exceeds a predefined threshold value. If the difference exceeds the predefined threshold value, then the stored leakage measurement is deemed invalid in operation 808 or valid in operation 810.

Figure 9:
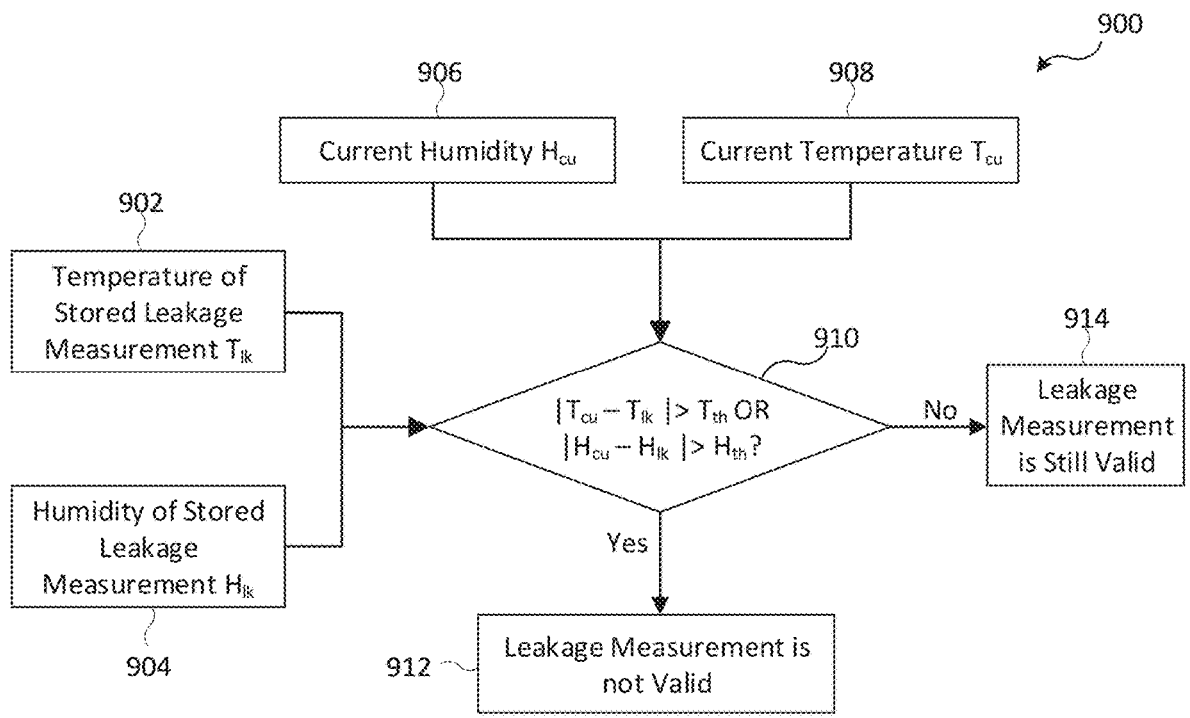
FIG. 9 illustrates a flowchart for determining validity of leakage measurements with reference to temperature and humidity as state variables according to various embodiments of the present disclosure.

FIG. 9 illustrates a flowchart for determining validity of leakage measurements with reference to temperature and humidity as state variables according to various embodiments of the present disclosure. A processor can make the validity determination in operation 910 based on a comparison of a temperature of a stored leakage measurement ($T_{lk}$) from operation 902 and a current temperature ($T_{cu}$) of the electronic device from operation 908, and/or a comparison of a humidity of a stored leakage measurement ($H_{lk}$) from operation 904 and a current humidity ($H_{cu}$) of the electronic device from operation 906. The stored state variable can be maintained in memory 160 and compared with the corresponding state variable determined by one or more sensors 175 capable of providing a current temperature and/or humidity.

In the non-limiting embodiment depicted in FIG. 9, a validity determination can be made in operation 910 if a difference between the current temperature ($T_{cu}$) and the stored temperature ($T_{lk}$) associated with the stored leakage measurement exceeds a temperature threshold, and/or if a difference between the current humidity ($H_{cu}$) and the stored humidity ($H_{lk}$) associated with the stored leakage measurement exceeds a humidity threshold. The flowchart 900 proceeds to operation 912 if the temperature threshold is exceeded, the humidity threshold is exceeded, or both the temperature threshold and humidity threshold are exceeded. The flowchart 900 proceeds to operation 914 if neither the temperature threshold nor the humidity threshold is exceeded.

For ease of discussion, the opportunistic updating of leakage measurements can be separated into two different types of applications. The first type of application, which may be referred to herein as a Type 1 application, is an application that uses radar measurements. These radar-based applications do not necessarily require target detection as in a typical radar use case. Some examples include face authentication and gesture recognition where explicit radar detection is not required (although one can still be used). The second type of application, which may be referred to herein as a Type 2 application, does not use radar measurements. Type 2 applications can use other non-radar sensors (e.g., a camera) or no sensor at all. Operational contextual data from non-radar sensors or the application itself can be used to infer whether update of leakage measurement is possible (i.e., that the radar field-of-view is clear of objects so that a new leakage measurement can be obtained). In both Type 1 and Type 2 applications, a leakage measurement update decision is made based on the inference to determine whether an object is within a proximity to and within a field-of-view of an associated radar transceiver, which would prevent the capture of an accurate leakage measurement.

Figure 10:
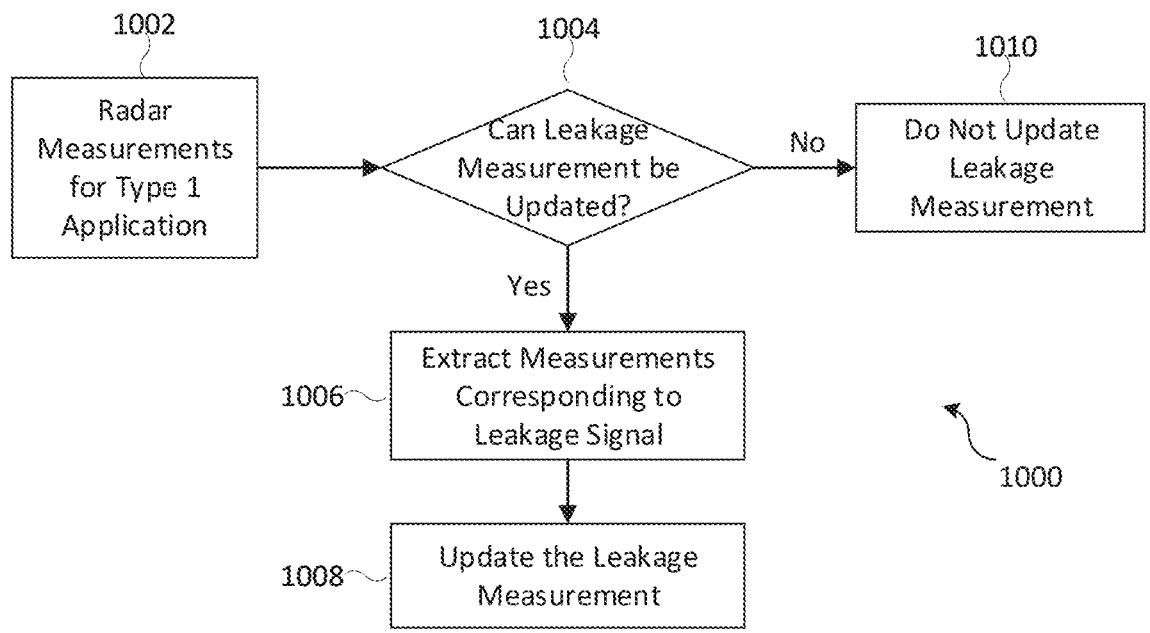
FIG. 10 illustrates a flowchart for a leakage measurement update decision for radar-based applications according to various embodiments of the present disclosure.

FIG. 10 illustrates a flowchart for a leakage measurement update decision for radar-based applications according to various embodiments of the present disclosure. A processor can execute instructions to cause an electronic device, such as processor 140 of electronic device 100 in FIG. 1, to undergo the operations described in flowchart 1000 to arrive at the leakage measurement update decision. Generally, Type 1 applications obtain and process radar measurements to generate some operational contextual data, which is application-specific, describing the state of the operation of the application. The operational context data can then be used to determine if the leakage measurement can be updated as described in FIG. 10 and the figures that follow.

In flowchart 1000, radar measurements are obtained in operation 1002 for Type 1 applications. The radar measurements can be obtained from radar transceiver 150 in FIG. 1. The radar measurements include leakage signals transmitted directly from the radar transmitter 157 to the radar receiver 159, as well as the signals returning to the receiver 159 from a target within a field-of-view of the radar transceiver 150.

Based on those radar measurements obtained in operation 1002, a determination is made in operation 1004 as to whether the leakage measurement can be updated. If the leakage measurement can be updated, then in operation 1006 measurements corresponding to the leakage signal are extracted from the radar measurement. In a particular embodiment, the extraction is achieved by selecting the signal response(s) corresponding to small delay taps (e.g., in the range from between 0-20 cm, or in the range between about 0-15 cm). These small delay taps may be referred to in the alternative as "leakage taps". Because leakage is the direct transmission between the transmitter and receiver the path length is short and thus its primary impact is at the short-range distance. For this reason, to cancel the main leakage, the radar measurements at close range or equivalently small delay indices are of particular concern.

In operation 1008, the stored leakage measurement can be updated with the extracted measurements corresponding to the leakage signal. If, at operation 1004 a determination is made that the leakage measurement cannot be updated, then the leakage signal is not updated at operation 1010.

Figure 11:
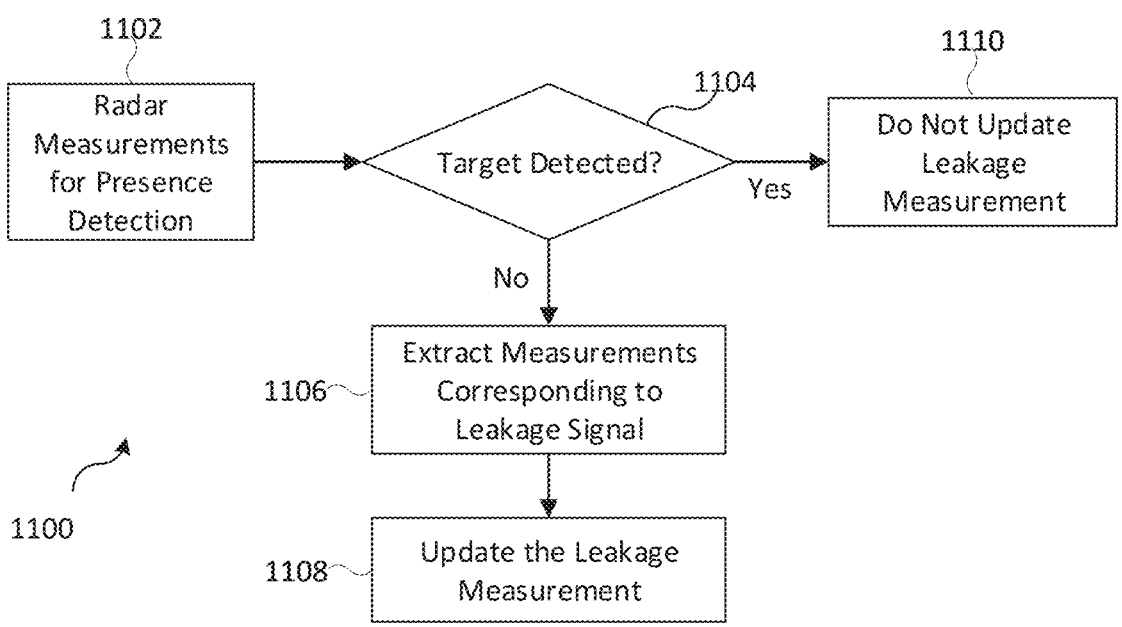
FIG. 11 illustrates a flowchart for a leakage measurement update decision for radar-based presence detection according to various embodiments of the present disclosure.

FIG. 11 illustrates a flowchart for a leakage measurement update decision for radar-based presence detection according to various embodiments of the present disclosure. The leakage measurement update decision can be made based, at least in part, on information from a Type 1 application that employs an algorithm for processing raw radar measurements to detect the presence of an object in its vicinity. The raw radar measurements include contributions from the leakage signal. The application might also have range estimation functionality that will likely be inaccurate due to the influence of the leakage signal, particularly in the close-range distances such as distances less than about 20 cm, or distances less than about 10 cm. Presence detection is achieved by observing the behavior of the CIR near the leakage taps. The leakage contribution which originates from a static source possesses certain behaviors. By detecting the deviation of the measured radar signals, it is possible to detect the presence of an object. Various approaches could be used as the detection algorithm. Some examples include classical signal processing algorithms and machine learning approaches. Some example signal processing approaches could be a method to detect the changes in the shape of the leakage CIR. Such a method can compute some notion of distance to some stored templates of the pure leakage CIR, and if the resulting distance deviate by a certain threshold, a target is detected; otherwise no target is detected. Some example machine learning approaches could be any classifiers such as the k-nearest neighbor or support vector machine or even neural network-based classifiers. The classifier can be trained to recognize the behavior of pure leakage CIR, so that it can differentiate pure leakage CIR from non-pure leakage CIR (i.e., when there are one or more targets present).

A processor can execute instructions to cause an electronic device, such as processor 140 of electronic device 100 in FIG. 1, to undergo the series of operations described in flowchart 1100. In operation 1102, radar measurements for presence detection are obtained. The measurements may be obtained by a radar transceiver 150 from FIG. 1. A determination is made in operation 1104 as to whether a target's presence is detected. If the target's presence is not detected, then no object is within proximity of and within a field of view of the radar transceiver. Measurements corresponding to the leakage signal between the transmitter and the receiver are extracted in operation 1106 and used to update the stored leakage measurement in operation 1108.

If a target is detected in operation 1104, then a possibility exists that the object could be within the proximity of and within the field of view of the radar transceiver. Accordingly, flowchart 1100 proceeds to operation 1110 and the stored leakage is not updated.

Figure 12:
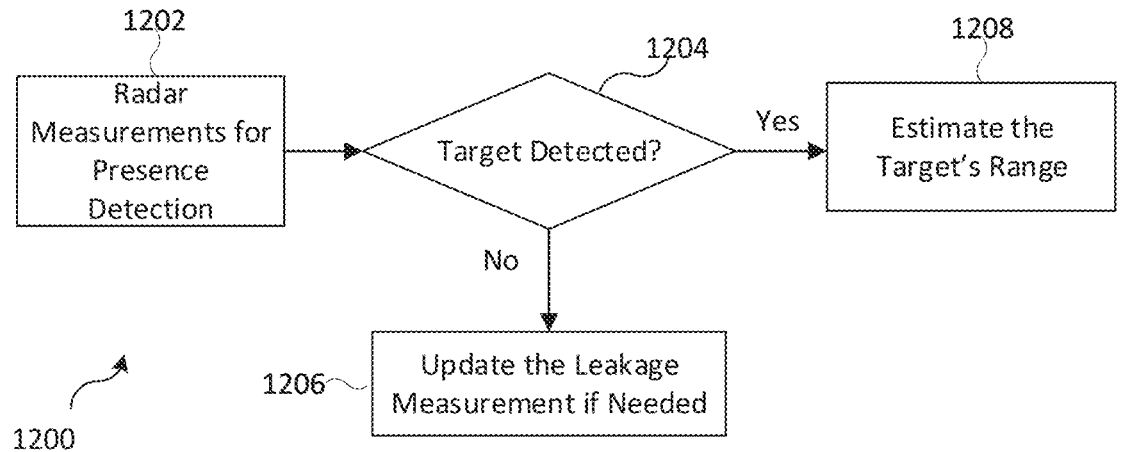
FIG. 12 illustrates a flowchart for radar-based range estimation using an updated leakage response according to various embodiments of the present disclosure.

FIG. 12 illustrates a flowchart for radar-based range estimation using an updated leakage response according to various embodiments of the present disclosure. A processor can execute instructions to cause an electronic device, such as processor 140 of electronic device 100 in FIG. 1 to undergo the series of operations described in flowchart 1200 for range estimation. In operation 1202, radar measurements for presence detection are obtained. A determination is made in operation 1204 as to whether a target is detected. If a target is not detected, then the stored leakage measurement is updated in operation 1206 if needed. In a non-limiting embodiment, the stored leakage measurement is updated by extracting the leakage signal from the radar measurements obtained in operation 1202. Returning back to operation 1204, if a target is detected, then the target's range is estimated in operation 1208 using an updated leakage response that was previously obtained.

Figure 13:
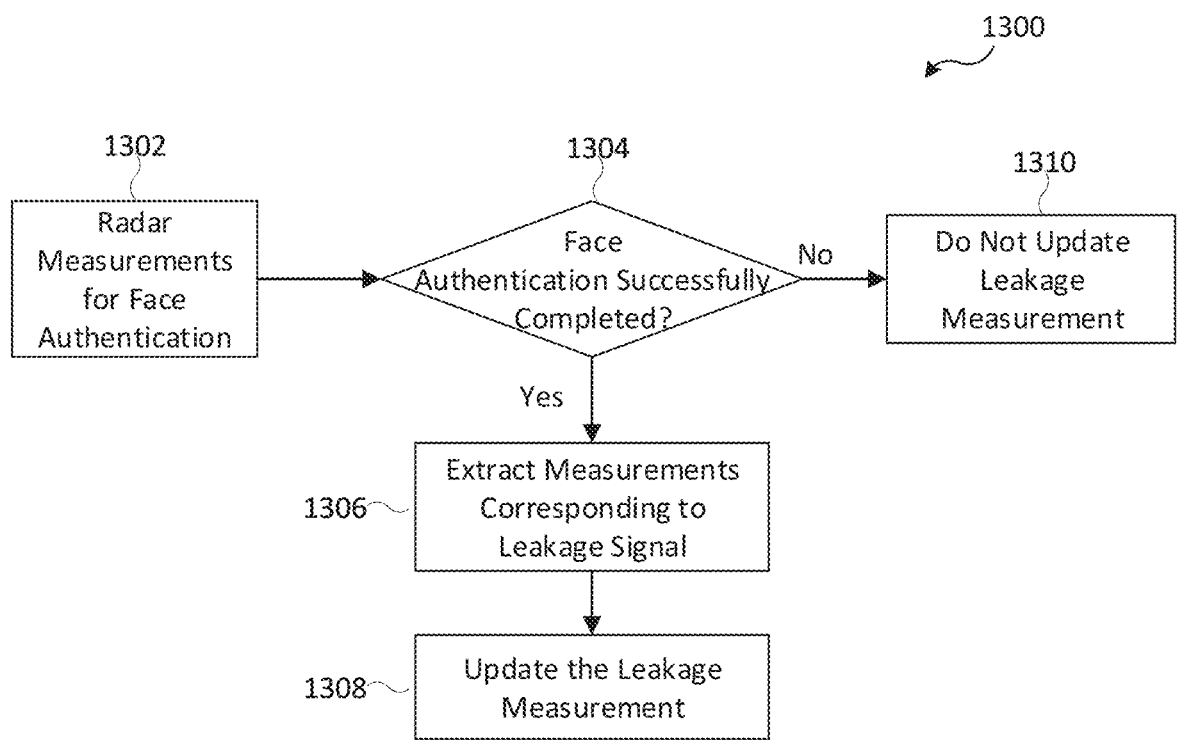
FIG. 13 illustrates a flowchart for a leakage measurement update decision for radar-based face authentication according to various embodiments of the present disclosure.
Figure 14:
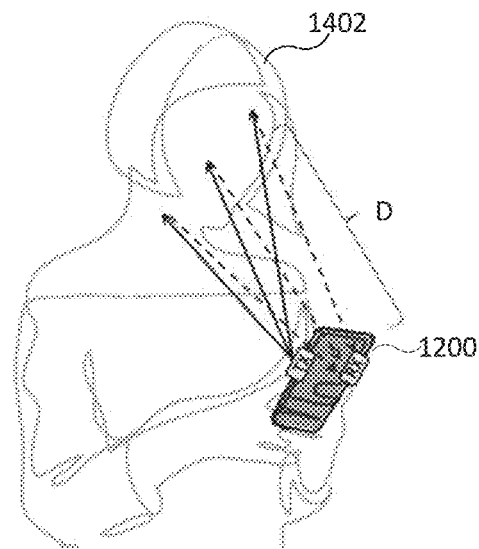
FIG. 14 illustrates a user interacting with an electronic device for a radar-based face authentication according to various embodiments of the present disclosure.

FIG. 13 illustrates a flowchart for a leakage measurement update decision for radar-based face authentication according to various embodiments of the present disclosure. Flowchart 1300 describes the use of operational context data from a radar-based face authentication application for the leakage update decision. Radar measurements for face authentication are inputs into a face authentication algorithm and the output of the face authentication application contains the desired operational contextual data. For example, if the face authentication application successfully performs a radar measurement, whether the user is authenticated or not, then it can be assumed that a face was properly captured in the radar measurements without any obstructing objects in the environment positioned between the radar transceiver and the user's face. An illustration depicting a typical use case of an electronic device for face authentication is depicted in FIG. 14. The radar measurements of the user's face contain leakage signals in the small delay taps that can be used for updating a leakage measurement.

Using radar measurements for face authentication obtained in operation 1302, a determination is made in operation 1304 as to whether face authentication is successfully completed. In one embodiment, the successful completion of face authentication is the authentication of a user on an electronic device executing the radar-based face authentication application. In another embodiment, successful completion of face authentication can be a rejection of the user's authentication attempt based on unobstructed radar measurements.

If face authentication is successfully completed, then measurements corresponding to the leakage signal is extracted from the radar measurements in operation 1306. A stored leakage measurement is updated with the extracted measurements in operation 1308. If face authentication is not successfully completed in operation 1304, then the leakage measurement is not updated in operation 1310.

FIG. 14 illustrates a user interacting with an electronic device for a radar-based face authentication according to various embodiments of the present disclosure. The electronic device 1400, which is an electronic device such as device 100 in FIG. 1, executes a radar-based authentication application (not shown) for authenticating user 1402. The electronic device 1400 is maintained a distance D away from a face of user 1402. Generally, the distance is between 20-50 cm, which ensures that objects are not present within a proximity to and within a field of view of the electronic device 1400 (i.e., between 0-20 cm from the electronic device).

Figure 15:
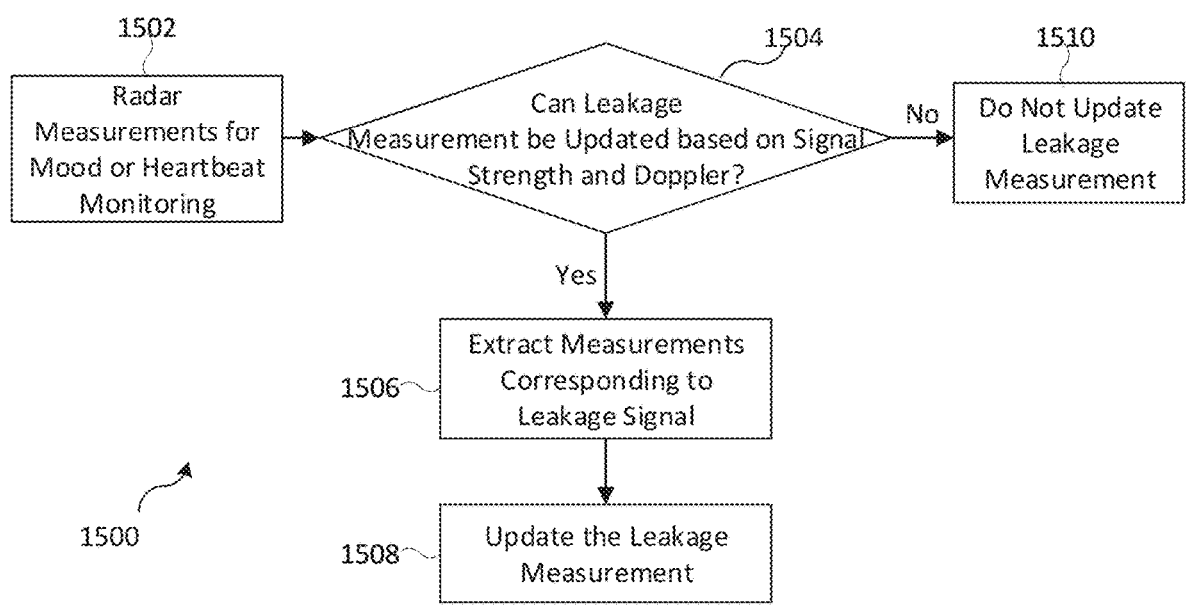
FIG. 15 illustrates a flowchart for a leakage measurement update decision for radar-based mood or heartbeat monitoring according to various embodiments of the present disclosure.

FIG. 15 illustrates a flowchart for a leakage measurement update decision for radar-based mood or heartbeat monitoring according to various embodiments of the present disclosure. Flowchart 1500 describes the use of operational contextual data from a radar-based mood or heartbeat monitoring application for the leakage update decision. Radar measurements can be used by a Type 1 application for monitoring a user's mood or heartbeat, an example of which is a mobile application for monitoring a driver for drowsiness or incapacity. Radar can be used to infer a driver's physical state based on physiological patterns such as heartbeat, breathing, etc. In this embodiment, the mobile device executing the Type 1 application can be placed on the dashboard facing the driver. In a typical use case, there will be no obstructing object between the radar transceiver and the driver.

Flowchart 1500 begins with radar measurements for mood or heartbeat monitoring, which are obtained in operation 1502. Using those radar measurements, operation 1504 determines whether leakage measurement can be updated based on signal strength and/or Doppler. Regarding the likelihood of clearance for leakage measurement, extra precautions can be incorporated to ensure a better quality of the captured measurements. For example, signal strength and Doppler information can be used to provide additional operational contextual data that can be used to determine if the vehicle is moving. Movement in the vehicle will manifest as vibrations in the electronic device, which are micromovements relative to other objects in the vehicle. By confirming that there is no substantial energy in the leakage tap signal in non-zero Doppler bins, it can be inferred that there is no obstructing object near the radar transceiver and the leakage can be updated. In other words, objects that are within a proximity of and within a field-of-view of the radar transceiver will have a reflected energy levels in the leakage taps that exceeds background levels. Conversely, the lack of objects within the proximity of and within the field-of-view of the radar transceiver will have reflected energy in the leakage taps that are proportionate with background levels. The amount of energy in the non-zero Doppler bins at the small delay taps as the inverse of the confidence level. That is the stronger the energy, the less likely that the leakage can be updated. Confidence levels are discussed in more detail in FIGS. 21 and 22 that follow.

If the leakage measurement can be updated, then a measurement corresponding to the leakage signal is extracted in operation 1506 from the radar measurements used in the mood or heartbeat application. However, if the leakage measurement cannot be updated based on the results of operation 1504, then the leakage measurement is not updated in operation 1510.

Figure 16:
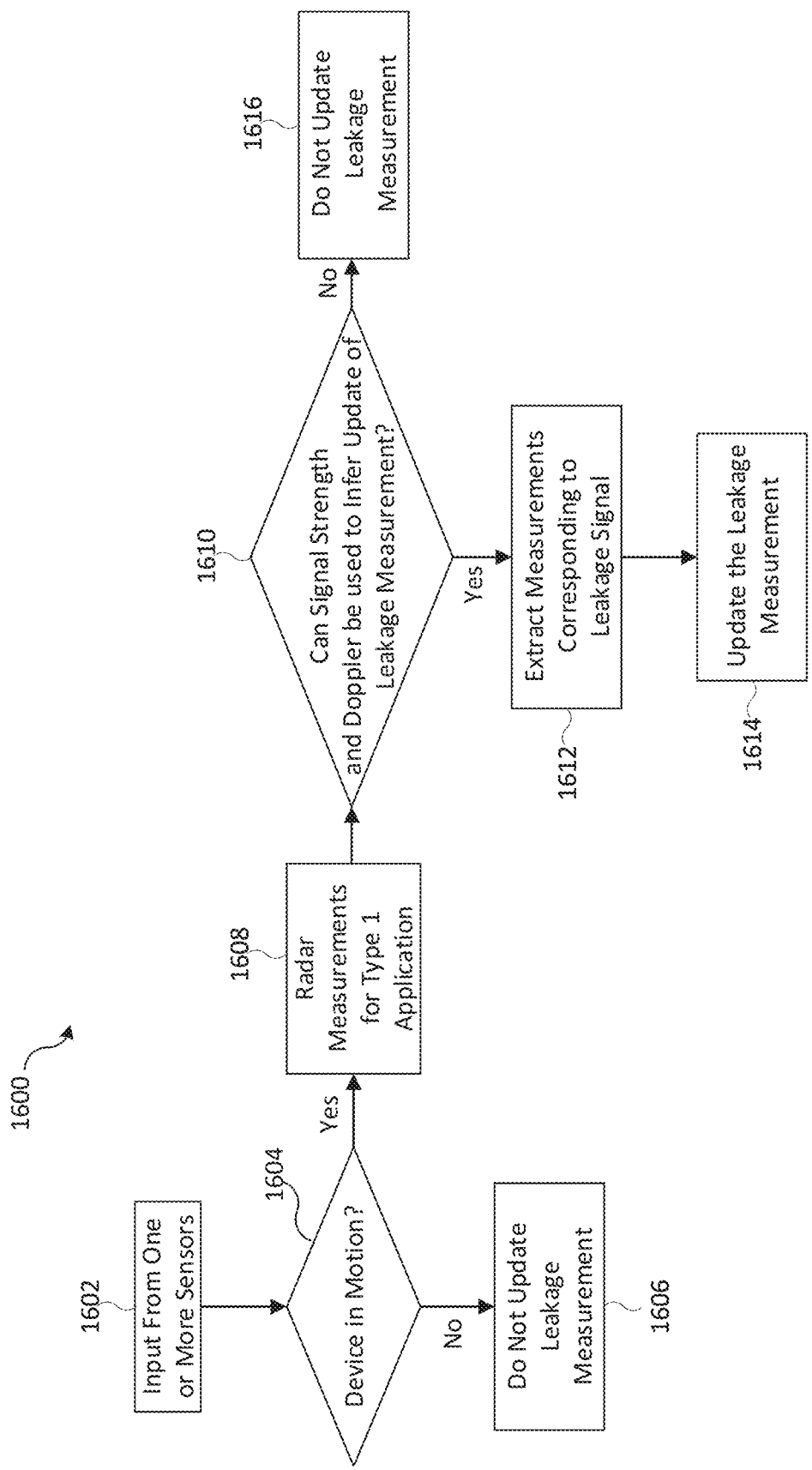
FIG. 16 illustrates a flowchart for a leakage measurement update decision for applications using a non-radar sensor and a radar transceiver according to various embodiments of the present disclosure.

FIG. 16 illustrates a flowchart for a leakage measurement update decision for applications using a non-radar sensor and a radar transceiver according to various embodiments of the present disclosure. A processor can execute instructions to cause an electronic device, such as processor 140 of electronic device 100 in FIG. 1 to undergo the operations described in flowchart 1600, for making an update decision using non-radar sensors and radar-based sensors. In a particular embodiment, the non-radar sensor is an inertial sensor that can be used to determine movement of the electronic device, and subsequent analysis of the radar measurement from the radar transceiver can be used to determine if a new leakage measurement can be obtained.

If the electronic device is in motion with respect to its surrounding, then the Doppler information and the signal strength can be used to detect if there is any obstacle in its vicinity. The device motion could also be inferred from the Type 1 application usage without using inertial sensors as described in more detail in FIG. 15. Since the device is in motion with respect to its immediate surrounding, if there is an obstructing object in the vicinity of the radar antenna module, then the reflection from this object will possess non-zero Doppler. The leakage being the direct signal from the radar transmit antenna to the receive antenna which are rigidly installed on the device will be static with respect to each other. The leakage signal will fall into the zero Doppler bin. Thus, by confirming that there is no substantial energy in the leakage taps signal in non-zero Doppler bin, it can be inferred that there is no obstructing object near the radar transceiver and the leakage can be updated. Note that in this case one can use the amount of energy in the non-zero Doppler bins at the small delay taps as the inverse of the confidence level. That is the stronger the energy, the less likely that the leakage can be updated, a fact that can be used during the calculation of confidence levels.

Flowchart 1600 begins with obtaining input from one or more sensors in operation 1602. Using the sensor input, operation 1604 determines whether the device is in motion. If the device is not in motion, then the leakage update measurement is not updated in operation 1606. However, if the device is in motion, then radar measurements are obtained in operation 1608 and the flowchart proceeds to operation 1610 where a determination is made as to whether signal strength and Doppler can be used to infer if a leakage measurement can be updated. If signal strength and Doppler can be used to infer that the leakage measurement can be updated, then the flowchart proceeds to operation 1612 where measurements corresponding to the leakage signal is extracted from the radar measurements. The leakage measurement is updated in operation 1614. However, if at operation 1610 a determination is made that signal strength and Doppler can be used to infer that the leakage measurement cannot be updated, then the update leakage measurement is not updated in operation 1616.

Figure 17:
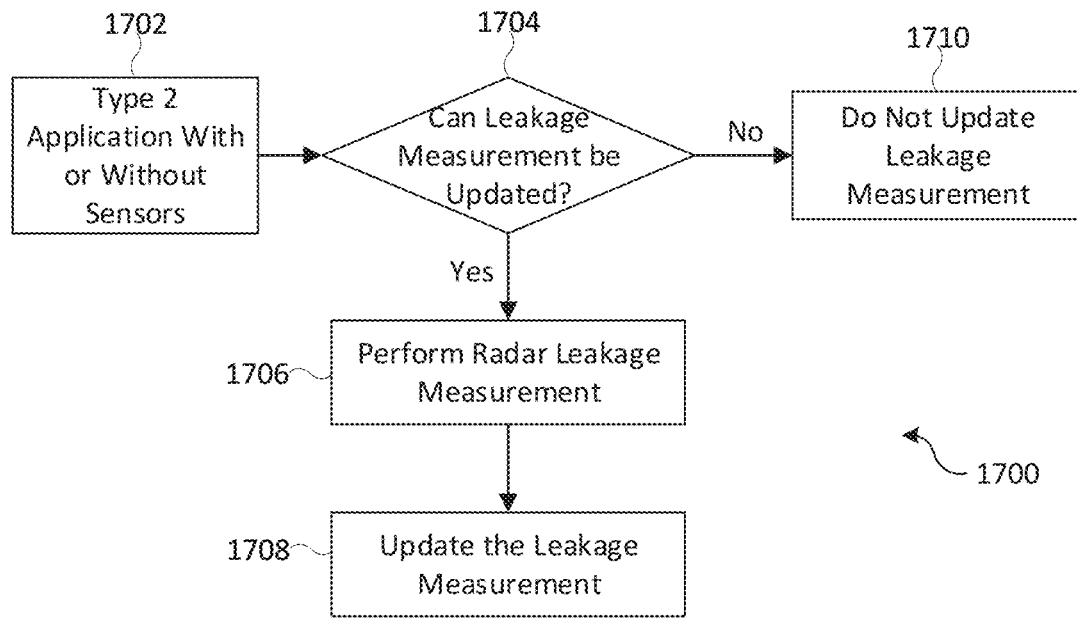
FIG. 17 illustrates a general flowchart for a leakage measurement update decision for a non-radar application according to various embodiments of the present disclosure.

FIG. 17 illustrates a general flowchart for a leakage measurement update decision for a non-radar application according to various embodiments of the present disclosure. A processor can execute instructions to cause an electronic device, such as processor 140 of electronic device 100 in FIG. 1, to undergo the series of steps described in flowchart 1700 to make the leakage measurement update decision.

Operational contextual data obtained in operation 1702 can be used to make a leakage measurement update decision in operation 1704. In some embodiments the Type 2 application uses non-radar sensors, such as proximity sensors and inertial sensors, to obtain operational contextual data, and in other embodiments the operational contextual data is derived directly from the execution of the application. In either event, if the leakage measurement can be updated, then a radar leakage measurement is performed in operation 1706. The radar leakage measurement is performed by activating the radar transceiver to perform a set of radar measurements that can be processed to obtain leakage measurements to update stored leakage measurements in operation 1708. If the leakage measurements cannot be updated in operation 1704, then the leakage measurements are not updated in operation 1710.

Figure 18:
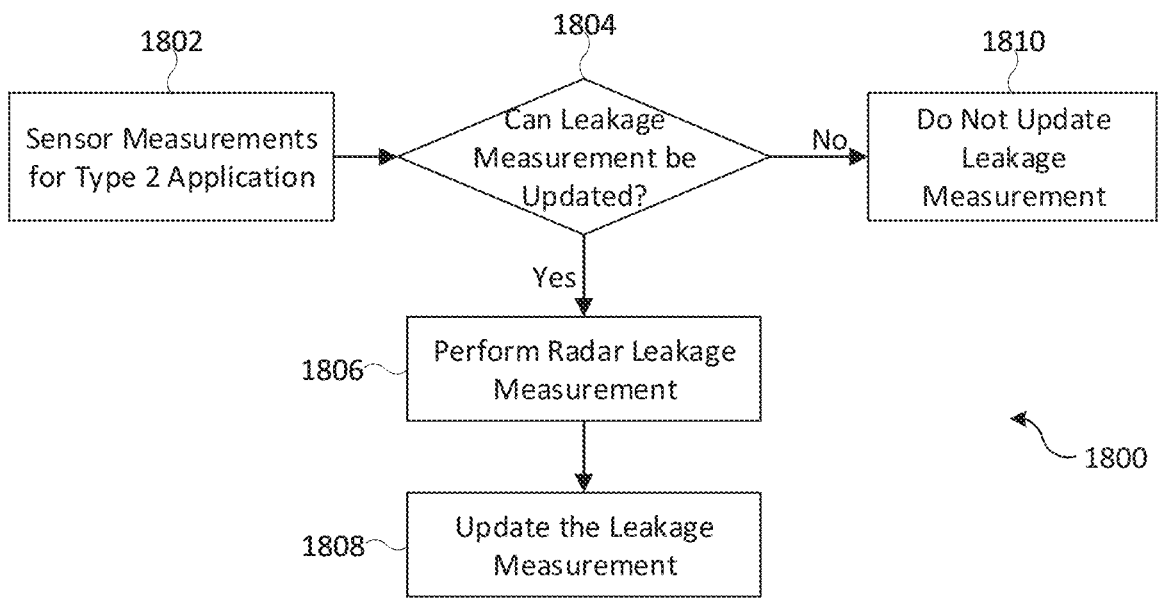
FIG. 18 illustrates a flowchart for a leakage measurement update decision for a non-radar application using sensors according to various embodiments of the present disclosure.

FIG. 18 illustrates a flowchart for a leakage measurement update decision for a non-radar application using sensors according to various embodiments of the present disclosure. A processor can execute instructions to cause an electronic device, such as processor 140 of electronic device 100 in FIG. 1, to undergo the series of steps described in flowchart 1800 to make the leakage measurement update decision. Sensor measurements for a Type 2 application are obtained in operation 1802. The sensor measurements can be captured directly from one or more sensors or derived from data captured by the one or more sensors.

In operation 1804 a determination is made as to whether the leakage measurement can be updated based on the sensor measurements. If the leakage measurement can be updated, then a radar leakage measurement is performed in operation 1806. The radar leakage measurement is performed by activating the radar transceiver to perform a set of radar measurements that can be processed to obtain leakage measurements to update stored leakage measurements in operation 1808. If the leakage measurements cannot be updated in operation 1804, then the leakage measurements are not updated in operation 1810.

Figure 19:
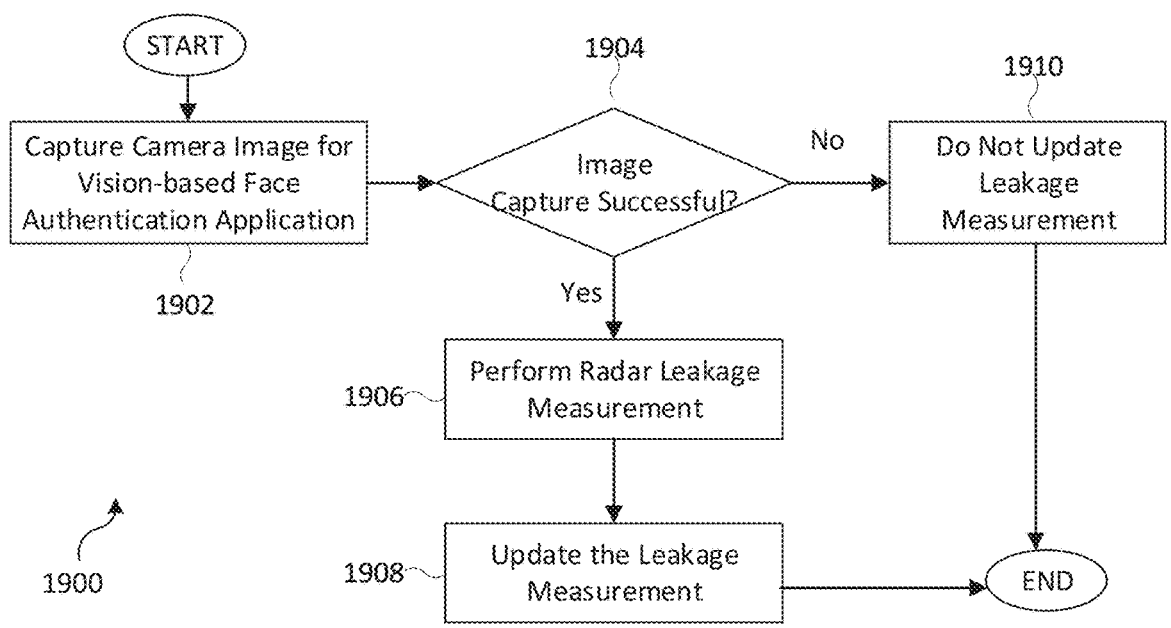
FIG. 19 illustrates a flowchart of a process for a leakage measurement update decision for vision-based face authentication in a non-radar application according to various embodiments of the present disclosure.

FIG. 19 illustrates a flowchart of a process for a leakage measurement update decision for vision-based face authentication in a non-radar application according to various embodiments of the present disclosure. A processor can execute instructions to cause an electronic device, such as processor 140 of electronic device 100 in FIG. 1, to undergo the series of steps described in flowchart 1900 to make the leakage measurement update decision based on a successful image capture. In particular, if a user's face is successfully captured, regardless of whether the user was actually authenticated, then an inference can be made that no objects are present between the electronic device and the user's face. This also means that the environment near the radar transceiver is clear for the leakage measurement. In some embodiments, the result of the vision-based authentication application can be a factor for consideration in a confidence level determination. For example, a successful authentication may be weighted higher than an unsuccessful authentication because an unsuccessful authentication could be attributed to additional factors, such as an unintended and undetected obstruction by a user's hand or fingers.

To reduce or eliminate obstructions by a user's hand or fingers, additional sensor data can be captured and used to determine the location of the user's hand or fingers. For example, capacitive touch sensors can be used to detect grip, or infrared-based proximity sensors near the radar transceiver can be used. The sensor data can be incorporated into the computation of a confidence level as will be described in FIGS. 21 and 22.

Returning to flowchart 1900, the process begins in step 1902 by capturing a camera image for a vision-based face authentication application. A determination is made as to whether the image capture was successful in step 1904. If the image capture was successful, then a radar leakage measurement is performed in step 1906 and the stored leakage measurement update is updated in step 1908. However, if at step 1904 a determination is made that the image capture was not successful, then the process continues to step 1910 and the stored leakage measurement update is not updated.

While the exemplary embodiment described in FIG. 19 is related to face authentication, the steps of flowchart 1900 can be generally applied to other forms of biometric authentication, such as iris sensor authentication and fingerprint authentication, where operational contextual data obtained in step 1902 can be used to infer that there is no object in the vicinity of the radar transceiver for the purpose of leakage measurement.

Figure 20:
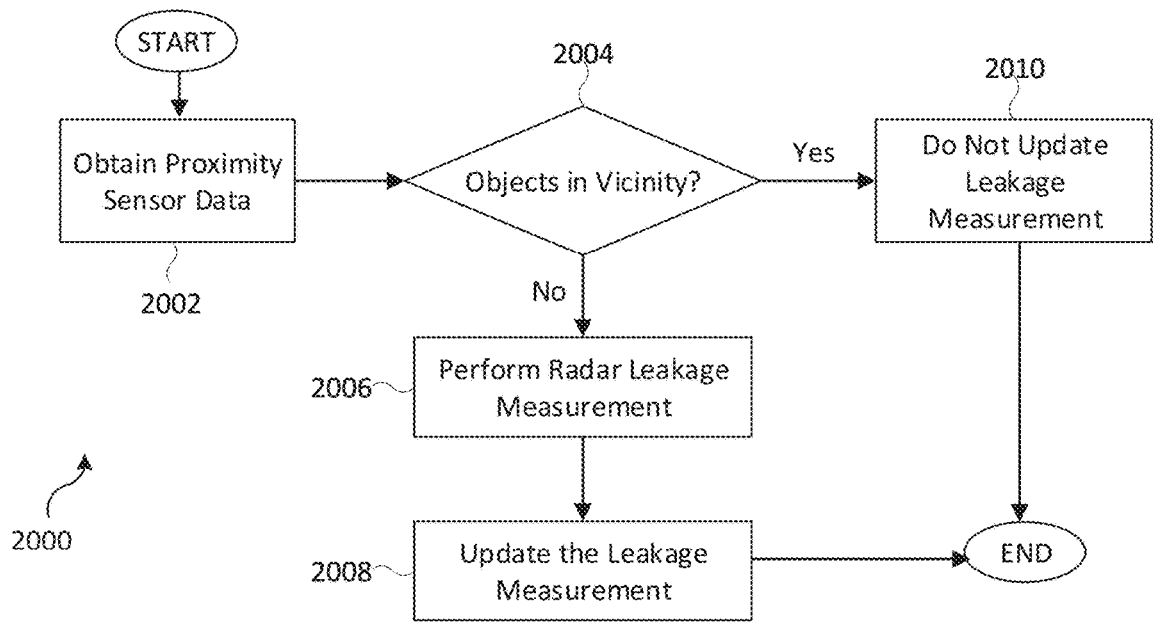
FIG. 20 illustrates a flowchart of a process for a leakage measurement update decision for proximity sensors in a non-radar application according to various embodiments of the present disclosure.

FIG. 20 illustrates a flowchart of a process for a leakage measurement update decision for proximity sensors in a non-radar application according to various embodiments of the present disclosure. A processor can execute instructions to cause an electronic device, such as processor 140 of electronic device 100 in FIG. 1, to undergo the series of steps described in flowchart 2000. In addition, sensors 175 can include one or more proximity sensors capable of capturing sensor data usable for making an update decision. Examples of proximity sensors include infrared, ultrasonic, laser, or capacitive based sensors or any other types of proximity sensing based on touch or hand grip, and even advanced methods like using image processing on camera image to identify objects and measure their distances.

Proximity sensor data is obtained in step 2002 and used to make a determination if objects are in a vicinity of the radar transceiver in step 2004. If objects are not in the vicinity of the radar transceiver, then a radar leakage measurement can be performed in step 2006 as described in earlier embodiments. A stored leakage measurement can be updated in step 2008 using the results of the radar leakage measurement before the process terminates. If a determination is made that an object is within the vicinity of the radar transceiver in step 2004, then the leakage measurement is not updated in step 2010 and the process terminates.

Figure 21:
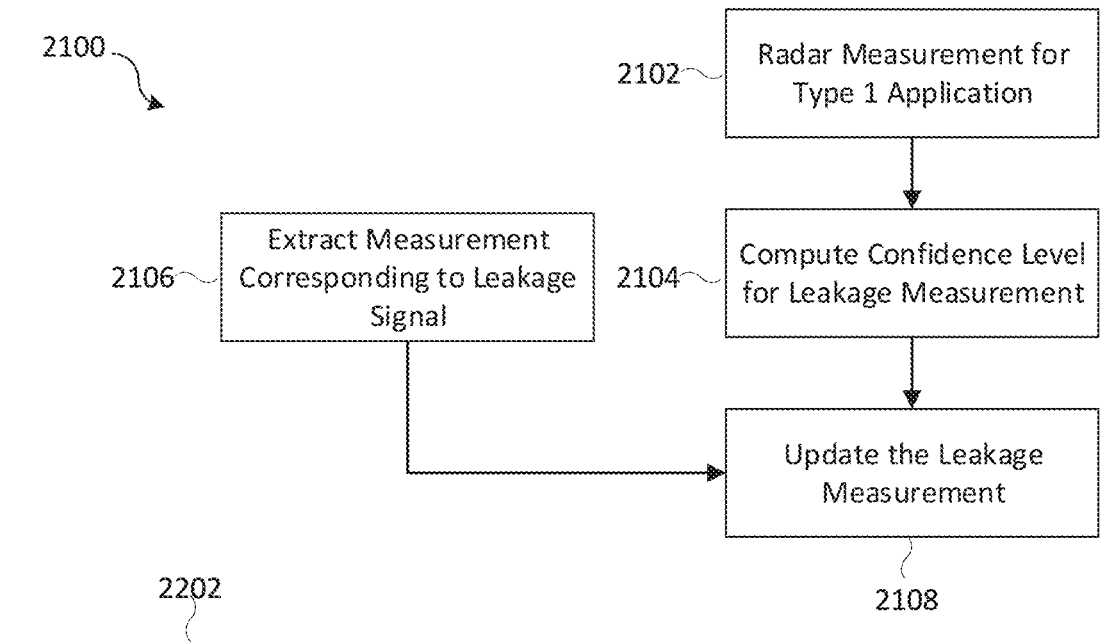
FIG. 21 illustrates a flowchart for integrating confidence levels into a leakage measurement update decision according to various embodiments of the present disclosure.

FIG. 21 illustrates a flowchart for integrating confidence levels into a leakage measurement update decision according to various embodiments of the present disclosure. A confidence level is a set of computed values that can be used to weight inputs to the leakage measurement update procedure. The confidence level can be computed by a processor in an electronic device, such as processor 140 of electronic device 100 in FIG. 1 from data captured by one or more sensors 175 or data originating from one or more of the applications 164 as previously discussed. Different approaches could be used to perform a leakage measurement update based on the confidence level. One example is to perform averaging weighted by the confidence level. Another possibility is to perform the averaging using weights computed using both the confidence level and the freshness of the measurement (e.g., determined from the recorded timestamp).

In operation 2102, radar measurements are obtained for a Type 1 application. A confidence level can be computed in operation 2104 based on the radar measurements and input into the leakage measurement update procedure of operation 2108, which also takes into consideration a radar measurement corresponding to the leakage signal that is extracted in operation 2106.

While the flowchart in FIG. 21 is described relative to a Type 1 application, contextual operational data can be captured from Type 2 applications for use in computing a confidence level that can be used in making a leakage measurement update decision. For example, a confidence level can be computed for the vision-based face authentication application described in FIG. 19, which takes into consideration not only that a successful image was captured for face authentication, but also whether the result of the face authentication was successful or not. A successful authentication may be given a higher confidence level than an unsuccessful authentication.

Figure 22:
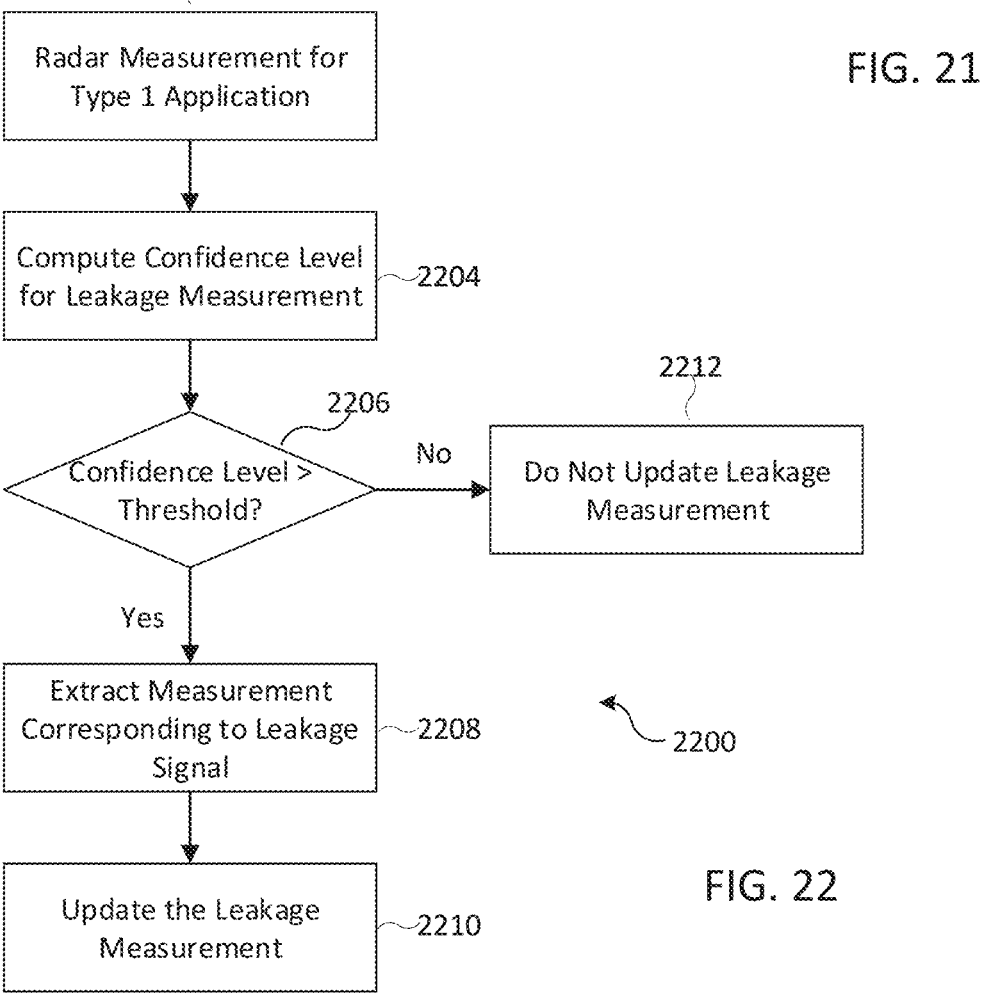
FIG. 22 illustrates a flowchart for integrating a confidence level decision into a leakage measurement update decision according to various embodiments of the present disclosure.

FIG. 22 illustrates a flowchart for integrating a confidence level decision into a leakage measurement update decision according to various embodiments of the present disclosure. The leakage measurement update decision combines a soft decision and a hard decision based on the confidence level. The confidence level can be computed by a processor in an electronic device, such as processor 140 of electronic device 100 in FIG. 1 from data captured by one or more sensors 175 or data originating from one or more of the applications 164 as previously discussed.

In operation 2202, radar measurements are obtained for a Type 1 application. A confidence level is computed in operation 2204 based on those radar measurements. In operation 2206, a determination is made as to whether the confidence level exceeds a threshold. If the confidence level exceeds the threshold, then in operation 2208 a measurement is extracted from the radar measurement that corresponds to the leakage signal. In operation 2210, the stored leakage measurement is updated. However, if at operation 2206 the determination is made that the confidence level does not exceed the threshold, then in operation 2212 the stored leakage measurement is not updated.

While the flowchart in FIG. 22 is described relative to a Type 1 application, contextual operational data can be captured from Type 2 applications for use in computing a confidence level that can be used in making a leakage measurement update decision. For example, a confidence level can be computed for the vision-based face authentication application described in FIG. 19. In addition, confidence levels can be incorporated into the Type 2 applications discussed in FIGS. 23 and 24 which use contextual operational data derived from voice or video call applications.

Figure 23:
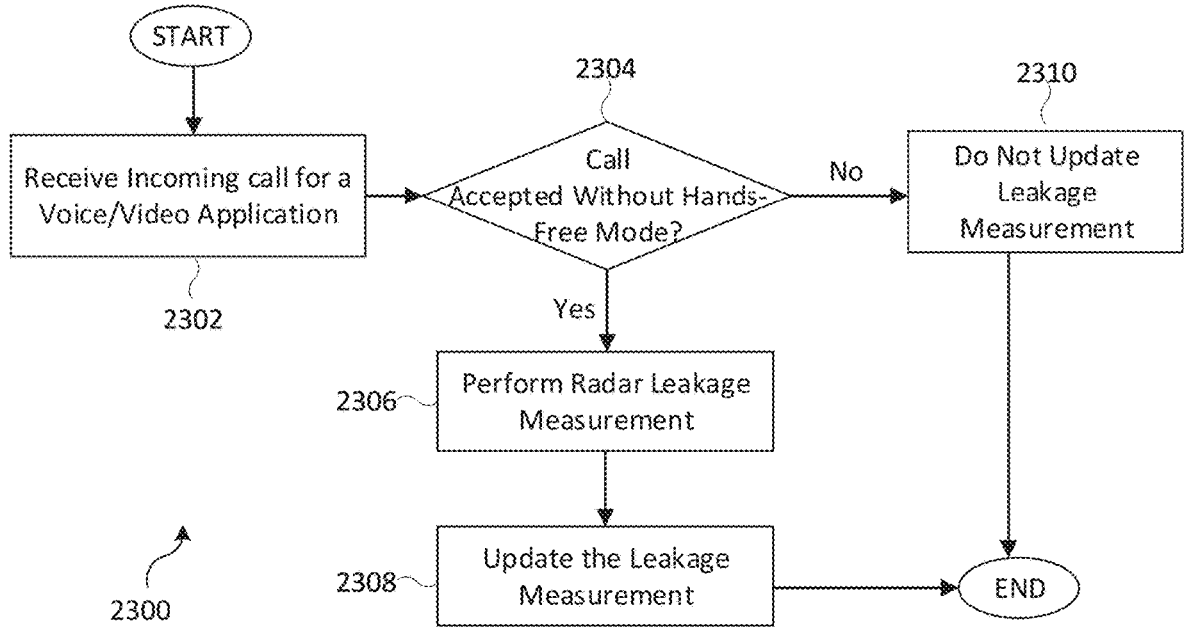
FIG. 23 illustrates a flowchart of a process for a leakage measurement update decision for a voice or video call application according to various embodiments of the present disclosure.

FIG. 23 illustrates a flowchart of a process for obtaining a leakage measurement update decision for a voice or video application according to an illustrative embodiment. The process can be implemented in a communication-enabled electronic device, such as a phone, a tablet, or a smart watch. Additionally, the process proceeds under the assumption that calls accepted while the electronic device is not in hands-free mode will be brought towards the user's face or suspended in midair by the user's hand so that the call can be conducted on speakerphone. A condition that hands-free mode is not used reduces the likelihood that the call might be accepted while the electronic device is maintained in a pocket.

The process starts when a call for a voice or video application is received in step 2302. A determination is made in step 2304 as to whether the call is accepted without hands-free mode. If the call is accepted without hands-free mode, then a radar leakage measurement is performed in step 2306. A stored leakage measurement is updated with the new radar leakage measurement in step 2308 and the process ends. Returning to step 2304, if a determination is made that the call is accepted without hands-free mode, then the stored leakage measurement is not updated in step 2310 and the process ends.

In another embodiment, a rejection of the call without hands-free mode active could also be used to trigger the radar leakage measurement on the assumption that the user would be holding the electronic device in such a manner that would not introduce an object within the proximity of and within a field of view of the radar transceiver.

In a variation of these embodiments, a time delay can be imposed after acceptance of the call before allowing performing the radar leakage measurement to ensure that the device is in midair without any obstruction within the proximity of the radar transceiver when the leakage measurement is captured. In yet another variation, a time window can be imposed for performing the radar leakage measurement in step 2306 to ensure that the leakage measurement is not obtained when the electronic device is proximate to or against a user's face.

In another variation of the embodiment described in FIG. 23, other non-radar applications can be substituted in place of the voice/video application as long as the other non-radar applications require a user to hold the electronic device in a particular position that could be used to infer that no objects are within a proximity of and within a field of view of a radar transceiver. For example, some gaming applications may require a user to place fingers into a position that does not obstruct the radar antenna module(s).

Figure 24:
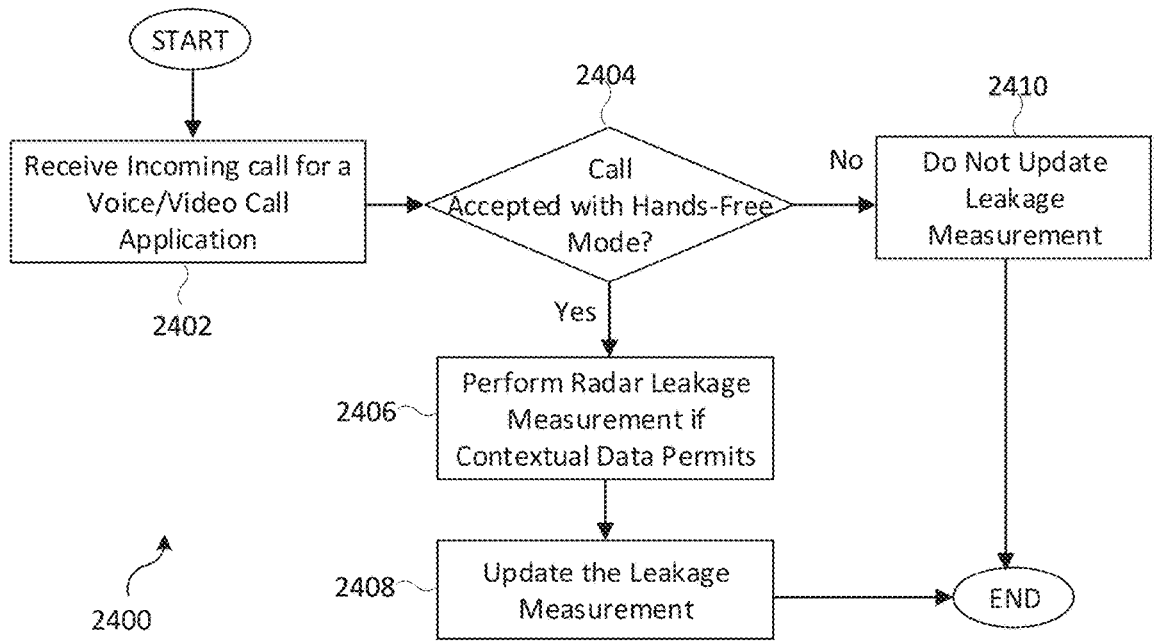
FIG. 24 illustrates a flowchart of a process for an alternative leakage measurement update decision for a voice or video call application according to various embodiments of the present disclosure.

FIG. 24 illustrates a flowchart of a process for an alternative leakage measurement update decision for a voice or video call application according to another illustrative embodiment. The process can be implemented in a communication-enabled electronic device, such as a phone, a tablet, or a smart watch, with hands-free mode active. Hands-free mode is active when the electronic device is connected to a user by wired or wireless headphones, which allows a user to accept or reject the call indirectly without regard to the position or location of the electronic device. For example, a user can accept a call with the phone in a pocket or face-down with the radar antenna module blocked. Additional contextual data may be necessary to determine whether the radar leakage measurement should be performed. Examples of contextual data can include data from proximity sensors, light detection sensors, positioning sensors that can be used to reduce the likelihood that radar leakage measurements will be performed when one or more objects are within a proximity to and within a field of view of the radar transceiver.

The process described in flowchart 2400 starts when a call for a voice or video application is received in step 2402. In step 2404 a determination is made as to whether the call is accepted with hands-free mode active. If the call is accepted with hands-free mode active, a radar leakage measurement is performed in step 2406 if contextual data permits. Thereafter, the stored leakage measurement is updated in step 2408 and the process terminates. If at step 2404 a determination is made that the call is not accepted with hands-free mode active, then the process does not update the leakage measurement in step 2410 and the process terminates.

Confidence levels can also be computed for the embodiments described in FIGS. 23 and 24. For example, positional sensors, light sensors, or proximity sensors providing operational contextual data consistent with an electronic device being present in a pocket or facedown on a surface can be used to compute a confidence level that disfavors the update of a stored leakage measurement update.

Figure 25:
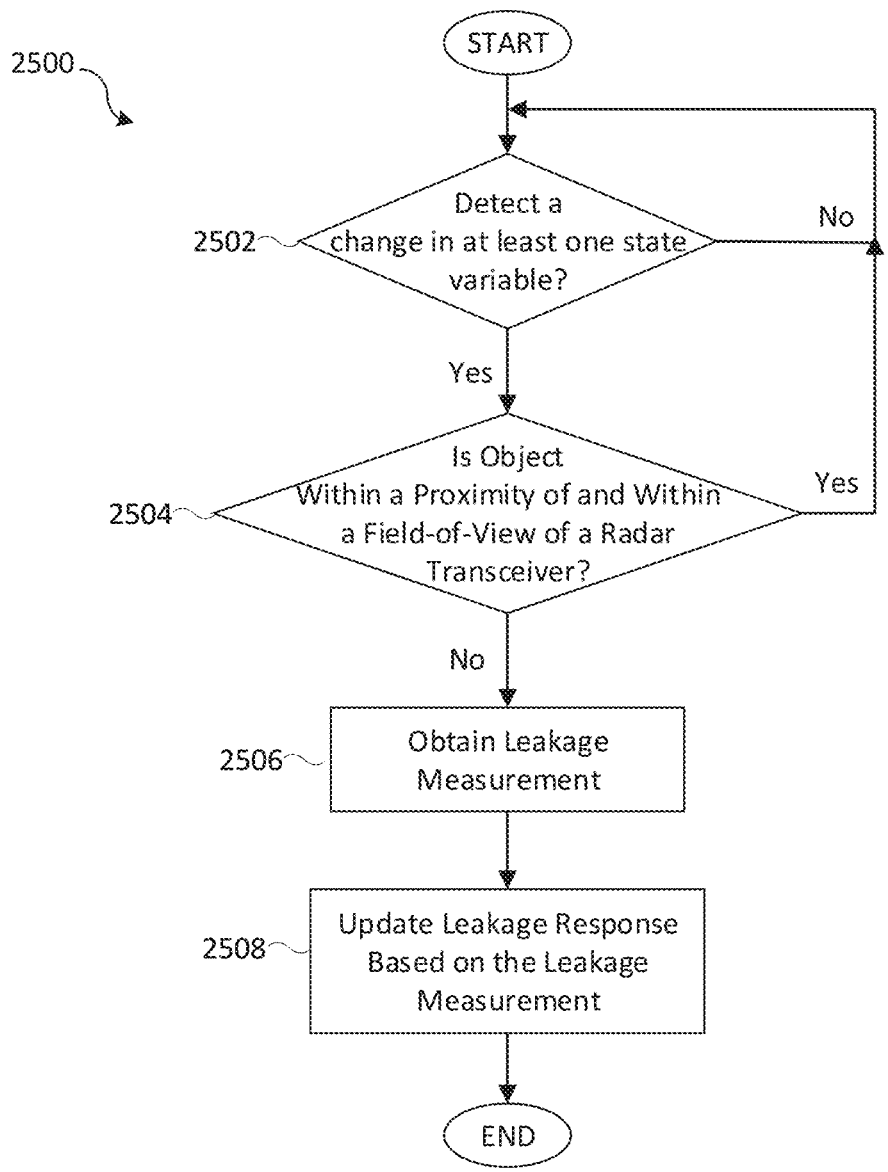
FIG. 25 illustrates a flowchart of a process for opportunistically updating a leakage response according to various embodiments of the present disclosure.

FIG. 25 is a flowchart of a process for opportunistically updating a leakage response according to various embodiments of the present disclosure. A processor can execute instructions to cause an electronic device, such as processor 140 of electronic device 100 in FIG. 1, to undergo the steps described in flowchart 2500 to opportunistically update a leakage response.

The process begins in step 2502 by making a determination as to whether a change in at least one state variable is detected. The change in the state variable can be used to identify whether a stored leakage measurement associated with the at least one state variable is still valid. Non-limiting examples of state variables can include time, temperature, humidity, or any other device-related state that can affect radar transmissions in an electronic device. In some embodiments, the change in the at least one state variable is determined by identifying any change in the state variable. In other embodiments, the change in state variable may be a change that exceeds some threshold value. For example, the change in state variable may be the passage of a discrete amount of time, or a temperature that changes by more than a certain number of degrees or by a certain percent.

If no change has been detected in step 2502, then update of a stored leakage response is unnecessary and the process returns to the start. If a change in the at least one state variable has been detected, then in step 2504 a determination is made as to whether an object is within a proximity of and within a field-of-view of a radar transceiver. If an object is within the proximity of and within a field-of-view of the radar transceiver, then the radar signals within the leakage taps cannot be accurately attributable to either the leakage signal or the object within the proximity of the field-of-view of the radar transceiver. Accordingly, the process returns to the start.

If an object is not within the proximity of nor within the field-of-view of the radar transceiver, then a leakage measurement is obtained in step 2506. The leakage measurement can be obtained in any number of ways as described in earlier embodiments. For example, the leakage measurement can be obtained by extracting a set of signals from a radar measurement captured during the execution of Type 1 applications, or by activating the radar transceiver to perform a set of radar measurements that can be processed to obtain leakage measurements after or during the execution of a Type 2 application.

In step 2508, the leakage response is updated based on the leakage measurement. The updating can be a simple replacement or can incorporate averages as described earlier. In addition, the updating can incorporate confidence levels as previously described. After the leakage response is updated, the process terminates.

As previously discussed in earlier embodiments, when the process of flowchart 2500 is applied to some Type 1 applications, the step of determining whether the object is within the proximity of and within the field of view of the radar transceiver involves performing a successful radar-based measurement on a target located outside of the proximity of the radar transceiver, and the step of obtaining the leakage measurement includes extracting signals from the successful radar-based measurement corresponding to a set of leakage taps.

As previously discussed in earlier embodiments, when the process of flowchart 2500 is applied to some Type 1 applications that have access to operational contextual data that includes Doppler data, the step of determining whether the object is within the proximity of and within the field of view of the radar transceiver includes confirming that reflected energy from within the proximity of the radar transceiver is proportionate with background levels.

As previously discussed in earlier embodiments, when the process of flowchart 2500 is applied to some Type 2 applications, the step of determining whether the object is within the proximity of and within the field of view of the radar transceiver includes performing a successful non-radar, sensor-based measurement on a target located outside of the proximity of the radar transceiver, and the step of obtaining the leakage measurement includes measuring a leakage signal between a transmitter and a receiver of the radar transceiver.

As previously discussed in earlier embodiments, when the process of flowchart 2500 is applied to some Type 2 applications with access to operational contextual data from one or more proximity sensors, the step of determining whether the object is within the proximity of and within the field of view of the radar transceiver includes determining, with a non-radar, proximity sensor that a target is not detected within the proximity of the radar transceiver, and the step of obtaining the leakage measurement includes measuring a leakage signal between a transmitter and a receiver of the radar transceiver.

As previously discussed in earlier embodiments, when the process of flowchart 2500 is applied to some Type 2 applications without access to operational contextual data from sensors, the step of determining whether the object is within the proximity of and within the field of view of the radar transceiver includes receiving a user input by the electronic device, the user input being correlated with an absence of any objects within the proximity of the radar transceiver. Examples of user input were described in more detail in FIGS. 23 and 24 and can include accepting or rejecting a voice or video call when the electronic device is not operating in hands-free mode. Another example of user input can be the movement of phone in three-dimensional space, such as when a user brings a phone towards the user's ear. In addition, the step of obtaining the leakage measurement further comprises measuring a leakage signal between a transmitter and a receiver of the radar transceiver.

None of the description in this application should be read as implying that any particular element, step, or function is an essential element that must be included in the claim scope. Moreover, none of the claims is intended to invoke 35 U.S.C. § 112(f) unless the exact words "means for" are followed by a participle.

What is claimed is:

1. An electronic device comprising:
 a radar transceiver;
 a memory configured to store data; and
 a processor operably connected to the radar transceiver, the processor configured to:
  determine whether an object is within proximity of and within a field of view of the radar transceiver;
  obtain a leakage measurement for the radar transceiver in response to determining that no object is proximate to and within the field of view of the radar transceiver; and
  update a leakage response for leakage cancelation based on the leakage measurement.

2. The electronic device of claim 1, wherein the processor is further configured to:
 detect a change in at least one state variable of the electronic device; and
 determine whether the object is within the proximity of and within the field of view of the radar transceiver by determining whether the object is within the proximity of and within the field of view of the radar transceiver in response to detecting the change in the at least one state variable.

3. The electronic device of claim 1, wherein the processor is configured to:
 determine whether the object is within the proximity of and within the field of view of the radar transceiver by performing a successful radar-based measurement on a target located outside of the proximity of the radar transceiver, and obtain the leakage measurement by extracting signals from the successful radar-based measurement corresponding to a set of leakage taps.

4. The electronic device of claim 1, wherein the processor is configured to:
determine whether the object is within the proximity of and within the field of view of the radar transceiver by confirming that reflected energy from within the proximity of the radar transceiver is proportionate with background levels.

5. The electronic device of claim 1, wherein the processor is configured to:
determine whether the object is within the proximity of and within the field of view of the radar transceiver further by performing a successful non-radar, sensor-based measurement on a target located outside of the proximity of the radar transceiver, and
obtain the leakage measurement by measuring a leakage signal between a transmitter and a receiver of the radar transceiver.

6. The electronic device of claim 1, wherein the processor is configured to:
determine whether the object is within the proximity of and within the field of view of the radar transceiver by determining, with a non-radar, proximity sensor that a target is not detected within the proximity of the radar transceiver, and
obtain the leakage measurement by measuring a leakage signal between a transmitter and a receiver of the radar transceiver.

7. The electronic device of claim 1, wherein the processor is configured to:
determine whether the object is within the proximity of and within the field of view of the radar transceiver by receiving a user input by the electronic device, wherein the user input is correlated with an absence of any objects within the proximity of the radar transceiver, and
obtain the leakage measurement by measuring a leakage signal between a transmitter and a receiver of the radar transceiver.

8. A method for updating a leakage response, the method comprising:
determining, by an electronic device having a radar transceiver, whether an object is within proximity of and within a field of view of the radar transceiver;
obtaining a leakage measurement for the radar transceiver in response to determining that no object is proximate to and within the field of view of the radar transceiver; and
updating the leakage response for leakage cancelation based on the leakage measurement.

9. The method of claim 8, further comprising detecting a change in at least one state variable of the electronic device; and
wherein determining whether the object is within the proximity of and within the field of view of the radar transceiver comprises determining whether the object is within the proximity of and within the field of view of the radar transceiver in response to detecting the change in the at least one state variable.

10. The method of claim 8, wherein determining whether the object is within the proximity of and within the field of view of the radar transceiver further comprises performing a successful radar-based measurement on a target located outside of the proximity of the radar transceiver, and
wherein obtaining the leakage measurement further comprises extracting signals from the successful radar-based measurement corresponding to a set of leakage taps.

11. The method of claim 8, wherein determining whether the object is within the proximity of and within the field of view of the radar transceiver further comprises confirming that reflected energy from within the proximity of the radar transceiver is proportionate with background levels.

12. The method of claim 8, wherein determining whether the object is within the proximity of and within the field of view of the radar transceiver further comprises performing a successful non-radar, sensor-based measurement on a target located outside of the proximity of the radar transceiver, and
wherein obtaining the leakage measurement further comprises measuring a leakage signal between a transmitter and a receiver of the radar transceiver.

13. The method of claim 8, wherein determining whether the object is within the proximity of and within the field of view of the radar transceiver further comprises determining, with a non-radar, proximity sensor that a target is not detected within the proximity of the radar transceiver, and
wherein obtaining the leakage measurement further comprises measuring a leakage signal between a transmitter and a receiver of the radar transceiver.

14. The method of claim 8, wherein determining whether the object is within the proximity of and within the field of view of the radar transceiver further comprises receiving a user input by the electronic device, wherein the user input is correlated with an absence of any objects within the proximity of the radar transceiver, and
wherein obtaining the leakage measurement further comprises measuring a leakage signal between a transmitter and a receiver of the radar transceiver.

15. A non-transitory, computer-readable medium storing instructions that, when executed by a processor of an electronic device, cause the electronic device to:
determine, by the electronic device, whether an object is within proximity of and within a field of view of a radar transceiver of the electronic device;
obtain a leakage measurement for the radar transceiver in response to determining that no object is proximate to and within the field of view of the radar transceiver; and
update a leakage response for leakage cancelation based on the leakage measurement.

16. The non-transitory, computer-readable medium of claim 15, further storing instructions that, when executed by the processor, cause the electronic device to:
detect a change in at least one state variable of the electronic device; and
determine whether the object is within the proximity of and within the field of view of the radar transceiver by determining whether the object is within the proximity of and within the field of view of the radar transceiver in response to detecting the change in the at least one state variable.

17. The non-transitory, computer-readable medium of claim 15, further storing instructions that, when executed by the processor, cause the electronic device to:
determine whether the object is within the proximity of and within the field of view of the radar transceiver by performing a successful radar-based measurement on a target located outside of the proximity of the radar transceiver, and obtain the leakage measurement by extracting signals from the successful radar-based measurement corresponding to a set of leakage taps.

18. The non-transitory, computer-readable medium of claim 15, further storing instructions that, when executed by the processor, cause the electronic device to:
   determine whether the object is within the proximity of and within the field of view of the radar transceiver further by performing a successful non-radar, sensor-based measurement on a target located outside of the proximity of the radar transceiver, and
   obtain the leakage measurement by measuring a leakage signal between a transmitter and a receiver of the radar transceiver.

19. The non-transitory, computer-readable medium of claim 15, further storing instructions that, when executed by the processor, cause the electronic device to:
   determine whether the object is within the proximity of and within the field of view of the radar transceiver by determining, with a non-radar, proximity sensor that a target is not detected within the proximity of the radar transceiver, and
   obtain the leakage measurement by measuring a leakage signal between a transmitter and a receiver of the radar transceiver.

20. The non-transitory, computer-readable medium of claim 15, further storing instructions that, when executed by the processor, cause the electronic device to:
   determine whether the object is within the proximity of and within the field of view of the radar transceiver by receiving a user input by the electronic device, wherein the user input is correlated with an absence of any objects within the proximity of the radar transceiver, and
   obtain the leakage measurement by measuring a leakage signal between a transmitter and a receiver of the radar transceiver.

* * * * *